(12) United States Patent
Toffey et al.

(10) Patent No.: US 7,756,777 B2
(45) Date of Patent: Jul. 13, 2010

(54) METHOD AND SYSTEM FOR ADMINISTERING PRIME BROKERAGE

(75) Inventors: James Worden Toffey, Summit, NJ (US); Thomas Garley, Shrewsbury, NJ (US)

(73) Assignee: Tradeweb Markets LLC, Jersey City, NJ (US)

( * ) Notice: Subject to any disclaimer, the term of this patent is extended or adjusted under 35 U.S.C. 154(b) by 41 days.

(21) Appl. No.: 12/125,744

(22) Filed: May 22, 2008

(65) Prior Publication Data

US 2008/0281750 A1 Nov. 13, 2008

Related U.S. Application Data

(63) Continuation-in-part of application No. 10/808,820, filed on Mar. 25, 2004, now Pat. No. 7,433,842.

(60) Provisional application No. 60/939,551, filed on May 22, 2007, provisional application No. 60/457,845, filed on Mar. 25, 2003.

(51) Int. Cl.
G06Q 40/00 (2006.01)
(52) U.S. Cl. .......................... 705/37; 705/38
(58) Field of Classification Search .............. 705/37–38
See application file for complete search history.

(56) References Cited

U.S. PATENT DOCUMENTS

| | | | |
|---|---|---|---|
| 4,674,044 A | 6/1987 | Kalmus et al. | |
| 4,750,135 A | 6/1988 | Boilen | |
| 5,003,473 A | 3/1991 | Richards | |
| 5,077,665 A | 12/1991 | Silverman et al. | |
| 5,136,501 A | 8/1992 | Silverman et al. | |
| 5,168,446 A | 12/1992 | Wiseman | |
| 5,195,031 A | 3/1993 | Ordish | |
| 5,270,922 A | 12/1993 | Higgins | |
| 5,297,032 A | 3/1994 | Trojan et al. | |

(Continued)

OTHER PUBLICATIONS

International Search Report and Written Opinion from the International Searching Authority (US) for International Application No. PCT/US08/64550 dated Aug. 8, 2008.
International Search Report from the International Searching Authority (US) for International Application No. PCT/US05/10226 dated Jun. 19, 2006.

*Primary Examiner*—Thu Thao Havan
(74) *Attorney, Agent, or Firm*—Stroock & Stroock & Lavan LLP

(57) ABSTRACT

A Straight-Through-Processing (STP) trading platform provides a fully electronic and seamless solution to substantially all aspects of the trading cycle for fixed income instruments and other financial instruments. In an exemplary embodiment, one or more customers, one or more dealers and one or more prime brokers have access to computer software that facilitates trade order management, trade order generation, trade execution, trade allocation, allocation acknowledgement, trade confirmation, acquisition of settlement instructions, and the generation of progress reports based on specific metrics criteria. In said exemplary embodiment, the STP trading platform allows a prime broker to monitor and approve a trade where the STP trading platform includes software modules including at least an account management module and an electronic trading module to handle the various stages of executing a trade, confirming the trade, and facilitating settlement of the trade.

19 Claims, 20 Drawing Sheets

U.S. PATENT DOCUMENTS

| | | | |
|---|---|---|---|
| 5,497,317 A | 3/1996 | Hawkins et al. | |
| 5,502,637 A | 3/1996 | Beaulieu et al. | |
| 5,727,165 A | 3/1998 | Ordish et al. | |
| 5,774,880 A | 6/1998 | Ginsberg | |
| 5,826,243 A | 10/1998 | Musmanno et al. | |
| 5,857,176 A | 1/1999 | Ginsberg | |
| 5,905,974 A | 5/1999 | Fraser et al. | |
| 5,924,082 A | 7/1999 | Silverman et al. | |
| 5,924,083 A | 7/1999 | Silverman et al. | |
| 5,927,031 A | 7/1999 | Martin | |
| 5,940,809 A | 8/1999 | Musmanno et al. | |
| 5,946,667 A | 8/1999 | Tull, Jr. et al. | |
| 5,987,432 A | 11/1999 | Zusman et al. | |
| 6,006,206 A | 12/1999 | Smith et al. | |
| 6,016,482 A | 1/2000 | Molinari et al. | |
| 6,092,056 A | 7/2000 | Tull, Jr. et al. | |
| 6,105,005 A | 8/2000 | Fuhrer | |
| 6,173,270 B1 * | 1/2001 | Cristofich et al. | 705/37 |
| 6,260,025 B1 | 7/2001 | Silverman et al. | |
| 6,269,346 B1 | 7/2001 | Cristofich et al. | |
| 6,317,727 B1 | 11/2001 | May | |
| 6,317,751 B1 | 11/2001 | Yeger et al. | |
| 6,347,307 B1 | 2/2002 | Sandhu | |
| 6,393,409 B2 | 5/2002 | Young et al. | |
| 6,421,653 B1 | 7/2002 | May | |
| 6,462,758 B1 | 10/2002 | Price et al. | |
| 6,505,175 B1 | 1/2003 | Silverman et al. | |
| 6,519,574 B1 | 2/2003 | Wilton et al. | |
| 6,560,580 B1 | 5/2003 | Fraser et al. | |
| 6,587,840 B1 | 7/2003 | Smith et al. | |
| 6,606,637 B1 | 8/2003 | Hill et al. | |
| 7,433,842 B2 * | 10/2008 | Toffey | 705/37 |
| 2001/0051908 A1 | 12/2001 | Foster et al. | |
| 2002/0002530 A1 | 1/2002 | May | |
| 2002/0004777 A1 | 1/2002 | Foster et al. | |
| 2002/0016761 A1 | 2/2002 | Foster et al. | |
| 2002/0026400 A1 | 2/2002 | Naravan et al. | |
| 2002/0046149 A1 | 4/2002 | Otero et al. | |
| 2002/0046151 A1 | 4/2002 | Otero et al. | |
| 2002/0046156 A1 | 4/2002 | Horn et al. | |
| 2002/0049661 A1 | 4/2002 | Otero et al. | |
| 2002/0055901 A1 * | 5/2002 | Gianakouros et al. | 705/37 |
| 2002/0082967 A1 | 6/2002 | Kaminsky et al. | |
| 2002/0099651 A1 | 7/2002 | May | |
| 2002/0116317 A1 | 8/2002 | May | |
| 2002/0143694 A1 | 10/2002 | Young et al. | |
| 2002/0156719 A1 | 10/2002 | Finebaum et al. | |
| 2002/0169704 A1 | 11/2002 | Gilbert et al. | |
| 2002/0184142 A1 | 12/2002 | Whang | |
| 2003/0046095 A1 | 3/2003 | Jessop et al. | |
| 2003/0055774 A1 | 3/2003 | Ginsberg | |
| 2003/0061069 A1 | 3/2003 | Silverman et al. | |
| 2003/0088509 A1 | 5/2003 | Wilton et al. | |
| 2003/0093360 A1 | 5/2003 | May | |
| 2003/0115131 A1 | 6/2003 | Heaton et al. | |
| 2003/0139997 A1 | 7/2003 | Ginsberg | |
| 2003/0149646 A1 | 8/2003 | Chen et al. | |
| 2004/0236668 A1 | 11/2004 | Toffey | |
| 2005/0097029 A1 | 5/2005 | Cooper | |
| 2006/0161494 A1 | 7/2006 | Littlewood | |

* cited by examiner

| Network | Index | Accounts | Dealers | Custodians | Users | Admin | Logout | Help |
| Account List | Add Account | Copy Account | Acct Quick Add | Group List | Conf Contact List | Add Contact |

🖨 Print ▦ Acct List ▦ Scheduled List (acct) ▦ Scheduled List (acct) ⊞ Account Audit ⊞ Account Audit ☐ Edit ☐ Schedule Edit Branch Name: TW TradeXpress Inc Test    Branch Code: 1ABCDE762
Account Name: Test Separate Acct    Short Name: 629    ACODE XXXX444 — 610

Account Type: institutional    Account Sub Type: N/A
Tax Status: N/A    Tax ID: 0000000
Country Of occupation: UNITED STATES    Start Date: 11/21/2003 4:02:56 PM
Country Of jurisdiction: N/A    Account Group:
Settlement Profile: TEST BANK    Status: RELEASED
Last Modified: 11/20/2003 4:02:56 PM    Modify by: N/A ⊞ Depository Country Product Type Search Settlement Insurance

| Country | Depository | Products | Complete |
|---|---|---|---|
| ⊞ US | Federal Reserve Bank (Fed Book Entry) | AGCY, GOV | No |
| ⊞ US | The Depository Trust Company (DTCC) | ABS, AQCY, COMM, CORP, EQTY, GOV, MBS, MHKT, MUHI | Yes |

© 2003 TradeWeb Group LLC. All rights reserved (57)

| | Branch Name | Co. Type | PB Clients | Accts |
|---|---|---|---|---|
| 1NewCo | New Jersey | Customer | YES | YES |
| 1NewCo | NY | Customer | YES | YES |
| 1NewCo | New York | Customer | YES | YES |
| aaa | aaa | Customer | YES | NO |
| Calgene | Grand Rapids | Customer | YES | YES |
| Calgene | New York2 | Customer | YES | YES |
| Calgene | Omaha | Customer | YES | YES |
| Calgene | New York | Customer | YES | YES |
| CDSTestCompany | New Jersey | Customer | YES | YES |
| CDSTestNonAllCompany | New Jersey | Customer | YES | YES |
| JP Morgan | New York | Dealer | YES | NO |
| TradeWeb | Miami | Tradeweb | YES | YES |
| TradeWeb | new br2 | Tradeweb | YES | YES |
| TradeWeb | new_branch | Tradeweb | YES | YES |

File Bookmark Composite Dealers Analytics Quick Ticket Msg Admin Windows Help

US_DEALER_DEV     LkUp                                                                 DETAIL ?

State AdviceAcc        Trade Date 01/23/2007         Company   Dummy Company
Dealer DLRX (NY)/1     Settlement 01/26/2007         Customer  STP Garley    IRN
Trade #22              Time 20:37:35 - 20/:37:35     LogonID   stpusertg     Sales
ECV ID                             ECV DSRV ALLO Yes                         AXEit Executing Dealer    DLRX
Trade Type          NEW Give-Up 20070123.DLRX..UCDS.22
Description         CDX-NA. IG-11V0L-6-V1 5Yr 75 BPS
RED/Maturity        2165B3AK9 06/20/2011
Notional            28,000,000
Adj. Notional/Factor 28,000,000 / 1.00000
Rate/Price          71.500 / 100.11638279
PV of Deal          -32,587.18
Accrued/Days        -20,416.67 / 35
Upfront Fee         -53,003.65 USD
Ref.Curve           SU38200701222233030

Sent   to Deriv/Serv                              Customer Account
Description                                         # Accounts 1
                                                    Breakdowns Sent

| < > | Detail | Tran | Trsy | Brkdn | UCDS | Blot | Msg Trade | Agcy | CashFlow | MBS | CDS Conf | Eugv | CP | CORP | USRP | CDS | ECDS | IRS | DSWP |

*Test Trade Detail – TradeWeb*

| | | | |
|---|---|---|---|
| State Accepted | Trade Date 04/02/2008 | Company | CDS Company |
| Dealer MER (NY)/2 | Settlement 04/07/2008 | Customer | Joe Trader |
| Trade #1 | Time 14:13:52–14:14:02 | Logon ID | joe trader Sales |
| ECV ID | ECV DSRV ALLO | Yes | |

YOU SELL PROTECTION

| | |
|---|---|
| Prime Broker | PB To Follow/Give-Up |
| TradeType | NEW 20080402.MER.UCDS.1 |
| Description | CDX-NA.IG-10-V1 5Yr 155 BPS |
| RED/Matutity | 2165BYA03 06/20/2013 |
| Notional | 25,000,000 |
| Adj. Notional/Factor | 25,000,000 / 1.00000 |
| Rate/Price | 121.250 / 101.55655972 |
| PV of Deal | -389,139.93 |
| Accrued/Days | -13,993.06 / 13 |
| Upfront Fee | -403,132.99 USD |
| Ref.Curve | SU3S20080402181330 |

Description myBESTX $7.500
USDEMO2

| Up | 14:05:54 | IFR PRICED: IPALCO USD400m By NC Life Yields 7.50% |
| ALL | 14:05:10 | IFR US TECHS: Bonds Consolidate; Sharp Flattening Maintained |
| | 14:00:26 | IFR CAN GOVTS: Flows Slowing, Looking Towards Employment Friday |
| | 13:21:15 | IFR CAN TECHS: End of the Bull Run? Jun CGBs Continue Slide |
| Dn | 13:10:43 | IFR LAUNCH: Province of Ontario USD1bn 5y Global |

FIG. 16

*Trade Account Breakdown*

Descr: CDX-NA.IG-10-V1 5Yr 06/20/13    Dealer: MER    Trade Date: 04/02/08
RED 2165BYA03                          Notional: 25,000    Settlement: 04/07/08
Trader #1                                                  PV of Deal: -389,139.93
☐ B/S SELL   ☐ Account                                     Rate: 121.250

| Account Short Name | V | Percent | PB Service | Prime Broker | Notional Amt | Upfront Fee |
|---|---|---|---|---|---|---|
| CREDIT ARB | = | 60.000 | Give-Up | DLRX ▸ | 15,000 | -241,879.79 |
| HEDGE FUND 1 | = | 10.000 | Give-Up | GS ▸ | 2,500 | -40,313.30 |
| IRS Fund | = | 30.000 | Give-Up | DLRX ▸ | 7,500 | -120,939.90 |
|  |  | 0.000 | Give-Up | Select ▸ PB | 0 | 0 |
|  |  | 0.000 | Give-Up | Select ▸ PB | 0 | 0 |
|  |  | 0.000 | Give-Up | Select ▸ PB | 0 | 0 |
|  |  | 0.000 | Give-Up | Select ▸ PB | 0 | 0 |
|  |  | 0.000 | Give-Up | Select ▸ PB | 0 | 0 |
|  |  | 0.000 | Give-Up | Select ▸ PB | 0 | 0 |
|  |  | 100.000 |  |  | 25,000 | -403,132.99 |

1610 myBESTX $7.500
USDEM02
Company: Customer    CDS Company: Joe Trader

METHOD AND SYSTEM FOR ADMINISTERING PRIME BROKERAGE

CROSS-REFERENCE TO RELATED APPLICATIONS

This application is a continuation-in-part of U.S. patent application Ser. No. 10/808,820, filed on Mar. 25, 2004, for METHOD AND SYSTEM FOR EFFECTING STRAIGHT-THROUGH-PROCESSING OF TRADES OF VARIOUS FINANCIAL INSTRUMENTS, which claims the benefit of U.S. Provisional Application No. 60/457,845, for METHOD AND SYSTEM FOR EFFECTING STRAIGHT-THROUGH-PROCESSING OF TRADES OF VARIOUS FINANCIAL INSTRUMENTS, filed on Mar. 25, 2003. This application also claims the benefit of U.S. Provisional Application No. 60/939,551 for METHOD AND SYSTEM FOR ADMINISTERING PRIME BROKERAGE, filed on May 22, 2007. Each of the foregoing applications are hereby incorporated herein by reference.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND

1. Field of the Invention

The present invention relates generally to electronic trading methods and systems and, more particularly, to administering prime brokerage through an electronic trading system that provides straight-through processing and the intercommunication therethrough.

2. Description of Related Art

Fixed income instruments, such as treasuries, mortgages, commercial paper offerings, corporate and government bonds, and the like, traditionally have been traded using an inefficient, error-prone manual process. Recently, the market for fixed income instruments has undergone a certain degree of automation. While such automation represents an improvement to the manual process, many of the problems and inefficiencies associated with the traditional, manual process still exist.

To summarize the manual process, a customer desiring to buy or sell a fixed income instrument first would make an inquiry, or a request for a quote, to a dealer that is willing to buy and sell such fixed income instrument. The customer may be any person or entity desiring to trade but generally refers to buy-side institutions, such as investment funds, institutional investors, money market funds, and mortgage brokers to name a few. The dealer generally is any person or entity that is registered with the Securities and Exchange Commission (SEC) or an equivalent non-U.S. regulator to deal (i.e., to make a market for) financial instruments for its own account (at its bid price) or sell from its own account (at its ask or offer price). In the past, to initiate the manual trading process, a customer would make an inquiry, for example, via the telephone or facsimile transmission. Frequently, the customer would make an inquiry to several dealers with which the customer has a relationship before identifying a dealer willing to trade in the desired instrument. Because the manual process required the customer to telephone each of the dealers individually, the process of requesting price quotes could take several minutes during which time the market may have moved against the customer. Once the customer identified an acceptable dealer the customer and dealer would verbally agree to the negotiated price for the desired fixed income instrument and execute the trade.

Upon verbal agreement, both the customer and dealer would manually write the trade details on a trade ticket. A trade ticket typically comprised several layers of carbon paper, such that at least one layer could be passed to the back office personnel responsible for confirming trades. These processes are prone to error due to the manual nature of the recordation process. In this case, the trade details may be electronically transmitted to back office systems operated by personnel responsible for confirming trades.

Executing the trade, however, is only part of the trade cycle. Back office functions, such as confirmation, allocation and settlement, were also performed manually. Rule 10b-10 under the Securities Exchange Act of 1934 ("Rule 10b-10") and equivalent non-U.S. rules relating to confirmation and clearance of trades require that a dealer provide certain written disclosures to a customer immediately after the completion of a transaction to confirm the trade. In order to create the Rule 10b-10 confirmation, the dealer would manually extract the details of the trade, such as those passed on the trade ticket, and create a paper confirmation—an inefficient process prone to potential human error.

As for allocation, the customer, if trading on behalf of several client accounts, would have to transmit allocation instructions to the dealer regarding the financial instruments being bought or sold to any of the number of different sub-accounts. More specifically, a customer entering into a large block trade on behalf of several accounts would provide allocation instructions to the dealer, for example, via the telephone or via facsimile. Again, this manual process was open to human error, not only in providing and recording the proper instructions, but also in propagating the correct instructions to the other back office personnel responsible for other functions, such as confirmation and settlement.

In order to settle allocated trades, a customer would deliver settlement instructions (e.g., Central Securities Depository (CSD) settlement data, including the CSD address, swift codes, ABA number, account number and account name) to a dealer via facsimile or telephone. The dealer would manually input this information into their internal systems to generate the confirmation and to facilitate clearance and settlement of the securities traded. Following the customer's approval of the information, the dealer would provide the trade details and settlement instructions to the relevant clearing agency to effect settlement of the trade. Similar to the trade execution phase, there was no direct link between customers, dealers, and clearing institutions to exchange trade details and settlement instructions during the settlement process. Thus, the manual trading and settlement process was prone to errors and often took several days to complete.

The traditional manual process recently has given way to electronic trading systems as mentioned above. In general, although the electronic trading systems have several advantages over the manual process, such electronic trading systems have focused on the discreet parts of the trading cycle and, consequently, suffer from a lack of compatibility and interoperability. Furthermore, existing electronic trading systems, in large part, simply automate the manual process and thereby perpetuate the inefficiencies of the manual process and fail to provide needed new functionality. As discussed below, because existing electronic trading systems lack compatibility across the various stages of the trade cycle and fail to automate key post-trade functions, existing systems have failed to eliminate significant sources of error and inefficiencies.

More specifically, because electronic trading systems are directed to discreet parts of the trading cycle, such systems do not adequately provide a means to achieve straight-through processing (STP) of trades, namely, to execute block trades, allocate block trades to sub-accounts, confirm the trade, details, allocations and settlement instructions, and settle the trades based on such information. Absent custom-built communication interfaces, a system directed to one aspect of the trade cycle typically cannot automatically pass recoded information to a system directed to another aspect of the trade cycle. Thus, the information must be manually duplicated and re-entered at various points during the trading cycle.

For example, even where a dealer uses an electronic trading system to effectuate a trade, the dealer must manually input details of the trade into a separate back office system in order to generate confirmations and facilitate the settlement process. As a result, the post-trade confirmation and settlement process remains open to possible human error, even where electronic trading systems are used. Moreover, typical electronic post-trade allocation confirmation systems are often incompatible with electronic settlement instruction databases and systems that provide trade details regarding trades executed in non-electronic formats, such as via telephone, thereby forcing dealers to maintain redundant systems. Although an improvement to traditional manual processes, unnecessary duplication of records and potential delays with delivery of trade details, allocations, confirmations and settlement instructions and in the settlement of trades still exist.

Similarly, although many market participants have begun using electronic back office trade management systems, such systems are typically incompatible with front office electronic trade execution systems. Thus, even if a trade is executed electronically, the trade details must be manually input into the various back office systems. In short, the electronic trade allocation and settlement of fixed-income instruments remains a fractured process that is subject to inefficiencies and errors and prevents efficient straight-through-processing of trades.

Furthermore, efficiencies provided by existing electronic trading systems are typically limited to only a portion of a dealer's or customer's trading volume. Dealers frequently enter into trades via more than one electronic system and over the phone. These electronic systems, while providing increased efficiency for trades conducted on each system, are incompatible with each other and with manual processes, making it impossible to recognize a benefit of one system across all phases of the trading cycle. Indeed, such disparate systems can add to the complexity and inefficiency of management of a customer's or dealer's entire trading volume.

The inefficiencies of existing electronic systems are further exacerbated due to the lack of uniformity across market participants. Because trades must be accepted and confirmed at least by the two parties to the trade (and sometimes third and fourth parties), and because different parties often utilize incompatible systems, there is presently no system available that can process trades from generation to execution to allocation to confirmation and finally to settlement to achieve true straight-through processing of trades.

In addition to incompatibility among electronic trading systems limiting their effectiveness, existing electronic trading systems simply have automated the traditional, manual process without changing the general trading-cycle paradigm and without adding new features to enhance the usability or efficiency of the systems. As such, the existing electronic trading systems have many of the inherent inefficiencies as the manual trading.

Thus, a need exists for a system and method for effecting straight-through processing of trades and, more particularly, for a system and method for enabling electronic execution of trades, an electronic allocation and acceptance system that is integrated with a standing settlement instructions database, such that settlement instructions can be propagated throughout the trading cycle to reduce the possibility of costly and time consuming error inherent in the tradition manual process.

Furthermore, there is a need for a system and method for generating electronic trade confirmations that conform to regulatory standards to permit the virtually seamless execution, allocation, acceptance, confirmation and settlement of trades.

Moreover, because most existing fixed-income electronic trading systems merely implement the traditional customer inquiry-based and inventory-based trading paradigms, such electronic trading systems do not provide a means for permitting dealers to initiate trading by transmitting executable, firm trade offers. In the industry, a message from a dealer to a customer regarding a trade is commonly referred to as an "axe." Presently, dealer axes are communicated to customers via telephone or some other electronic based messaging system, such as through Bloomberg L.P.'s BLOOMBERG PROFESSIONAL® service, electronic mail, or an electronic indication of interest (IOI system). These systems, however, are inefficient for the transmission of axes for several reasons. Such systems do not permit the transmission of executable axes that are actionable by one or more customers to execute a trade. Thus, a need exists for trading systems and methods that provide increased liquidity and, more particularly, that allow dealers an improved means for initiating trades.

Moreover, as is known in the art, in addition to the dealer and the customer, the market for fixed income instruments also frequently includes a "prime broker." A prime broker, is a dealer who acts as a "manager" for certain institutional customers. More recently, the use of prime brokers has become popular with hedge funds. A customer that uses a prime broker allows the prime broker to monitor and/or process and settle trades on the customer's behalf. This enables the customer to: (i) use one or more prime brokers who have expertise in settling trades, and (ii) to trade with multiple dealers by setting up an account with the prime broker that includes the customer's capital which may include cash and securities. In certain circumstances, the customer is able to access the prime broker's capital and use it as their own. The relationship between the customer and a prime broker is governed by agreement, or as it is known in the art a Prime Broker Agreement and Master Give-Up Agreement between the prime broker and the customer specifying the scope of the prime broker's relationship with the customer, including when the prime broker may step in and execute a trade on the customer's behalf.

In practice, a customer who wants to execute a trade using its prime broker communicates with a dealer about the terms of a trade, the customer and dealer agree on the details of the trade, and the customer also informs the dealer as to which prime broker the customer wishes to use on the particular trade identified at the block level or at the sub-account level. Once the trade details have been finalized, the customer advises the prime broker of the details of the trade and the prime broker has a certain period of time within which to accept or reject the trade based on the terms of the master give-up agreement it has with its customer.

While there has been some automation of certain aspects of the trading process involving prime brokers, many problems and inefficiencies still exist in the inclusion of a prime broker in a financial transaction. Therefore, a need exists for a system and method that allows customers, dealers and prime brokers to execute a financial transaction that eliminates the inefficiencies of prior systems and methods involving prime brokers.

SUMMARY OF THE INVENTION

Various embodiments of the present invention satisfy the foregoing, as well as other needs. More specifically, such embodiments generally relate to an electronic trading platform that provides straight-through processing (STP) of various financial instruments, including, but not limited to, liquid fixed-income instruments utilizing a prime broker. The STP trading platform (e.g., systems and methods) described herein overcomes the shortcomings of present trading systems and methods for the trading, allocation, confirmation, prime broker interaction and settlement of fixed income instruments.

In an exemplary embodiment of the present invention, the STP trading platform has the ability to execute trades, dynamically allocate trades according to customer instructions, communicate with a one or more customers, one or more dealers and one or more prime brokers, confirm the trade details and allocations and provide accurate settlement instructions for the trades using a centralized database of standing settlement instructions.

The STP trading platform also is capable of generating electronic confirmations to facilitate confirmation and settlement of trades. Further, the STP trading platform is capable of leveraging it unique position as a centralized trading, allocation confirm the trade details and allocations and settlement platform to provide customers and dealers with advanced reporting of various industry and trade data. Additionally, the STP trading platform is also capable of receiving instructions from one or more prime brokers as to whether a trade has been approved and to allow a prime broker to step into a transaction. As will be appreciated by those skilled in the art, the STP trading platform permits participants to initiate trade inquires, execute trades, allocate trades to sub-accounts, communicate with one or more prime brokers, confirm the trade details and allocations and electronically confirm trades, so as to eliminate the need to manually input and re-input trade data in multiple systems designed to handle only one aspect of the trading cycle. Moreover, by maintaining a centralized database of standing settlement instructions, the described STP trading platform reduces the possibility of trade failures due to inaccuracies in the provisions of settlement instructions between customers and dealers. Thus, the standardized and integrated approach of the STP trading platform both streamlines and comprehensively improves the trading process. Due to integration of such functionality, the trading platform also provides an electronic, paperless solution for the entire trading cycle, including trade order generation, trade execution, prime broker administration, trade allocation, allocation and trade detail acknowledgement, electronic trade confirmation, and access to standing settlement instructions to facilitate settlement of trades.

In an exemplary embodiment, the STP trading platform comprises one or more software applications operative on a server system, along with data storage devices and communication devices, to achieve straight-through processing of the entire trading cycle.

Dealers, customers and prime brokers have access to computer software that facilitates trade order management, trade order generation, trade execution, trade allocation, allocation and trade details acknowledgement, trade confirmation, and finally enrichment of settlement instructions.

Thus, as is evident from the above-description, the STP trading platform integrates various software modules and communication links to process the originating execution, allocation, acknowledgement of allocation, prime broker administration, and trade details electronic confirmation, and enriching details with settlement instructions of trades. Additional features and advantageous of the system are described further below.

BRIEF DESCRIPTION OF THE DRAWINGS

FIG. 6 is a screen shot depicting an exemplary graphical user interface of the STP trading platform;

FIGS. 8-17 are screen shots depicting exemplary graphical user interfaces of various features of the STP trading platform;

DETAILED DESCRIPTION OF THE EXEMPLARY EMBODIMENTS

Figure 1:
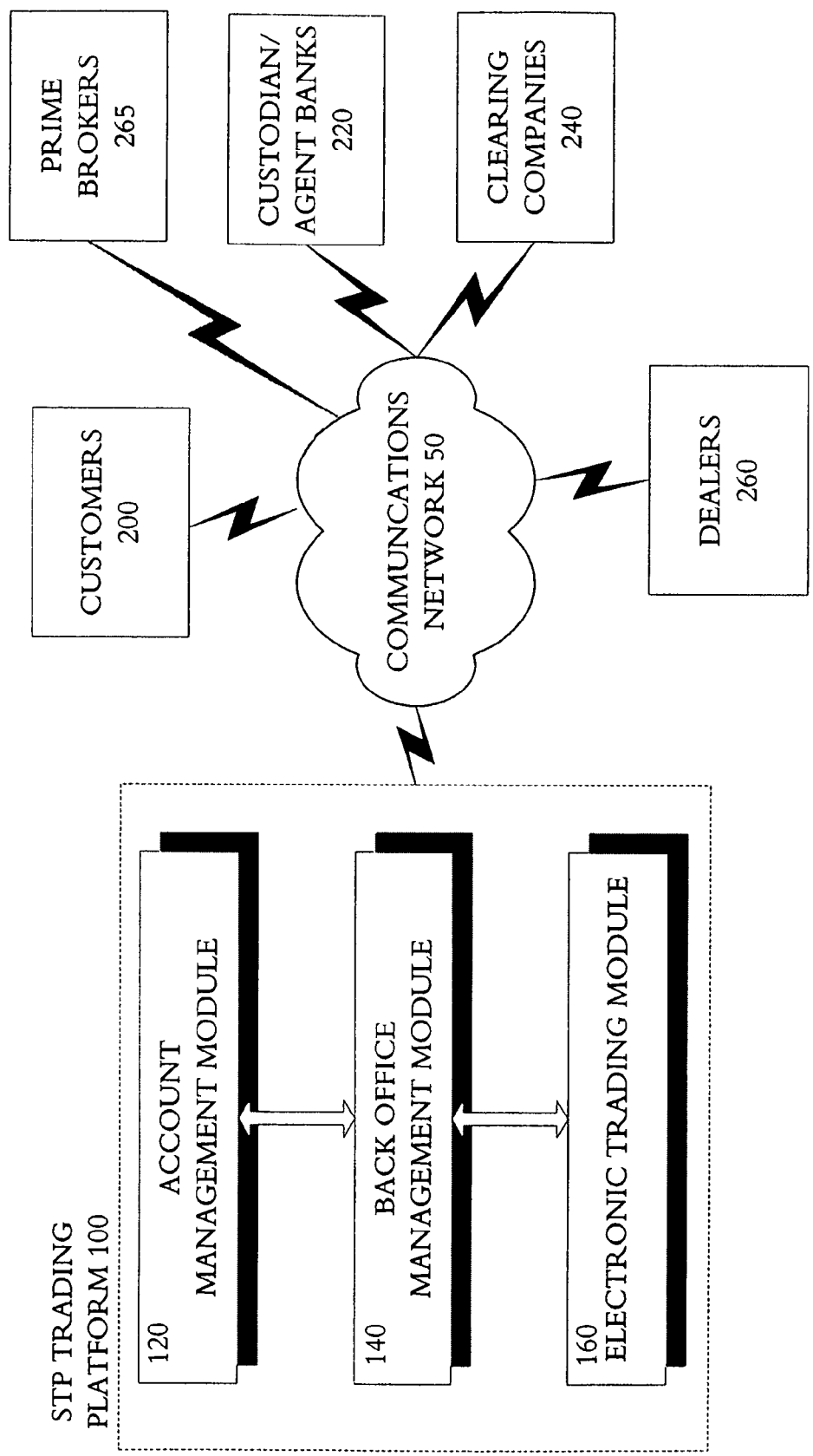
FIG. 1 is a schematic block diagram of an exemplary STP trading platform in communication with various users.
Figure 2:
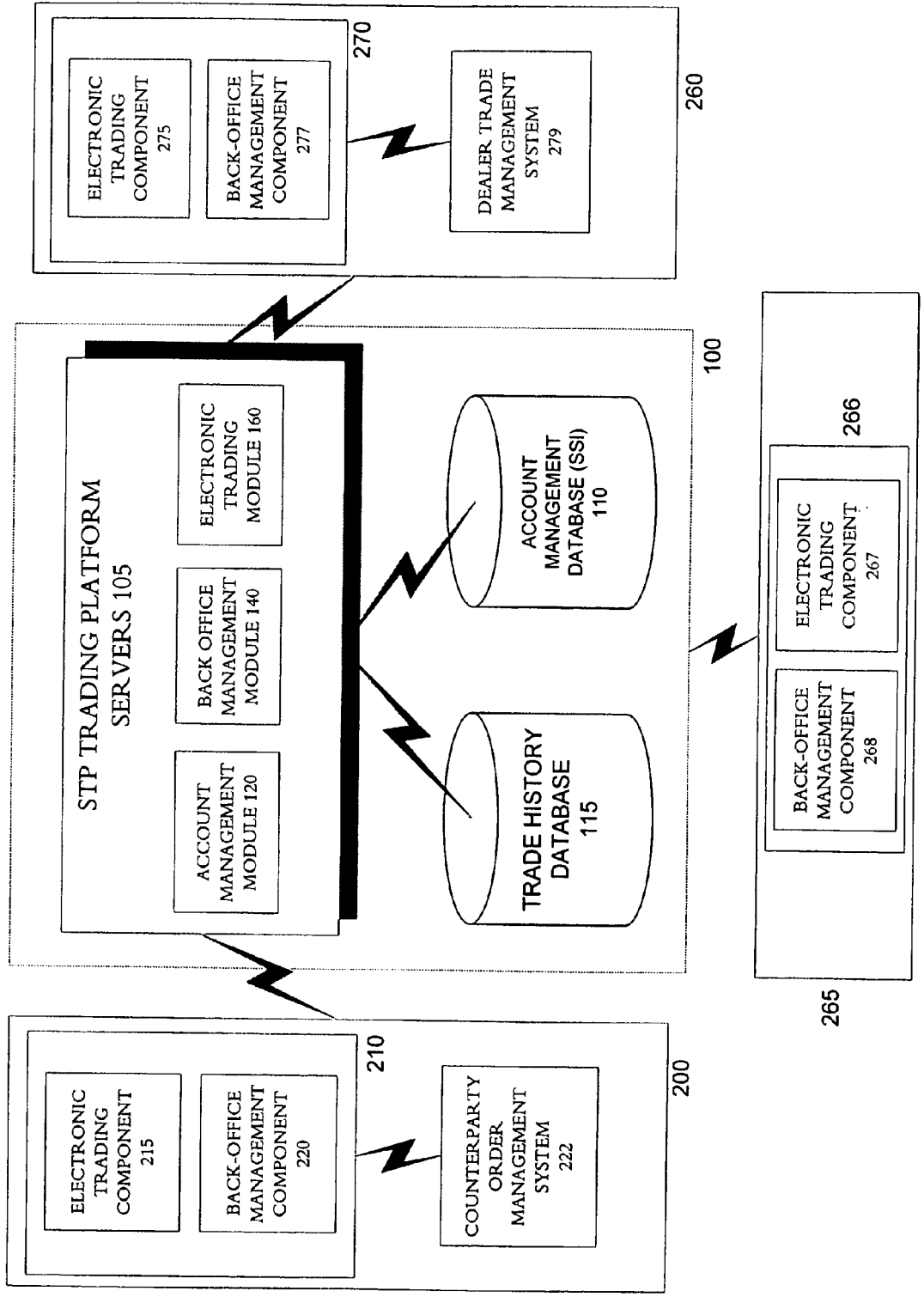
FIG. 2 depicts an exemplary system architecture of the STP trading platform.

In an exemplary embodiment, as shown in FIG. 1, a computerized STP trading platform 100 interconnects the computers of customers 200, custodians 280, such as a bank, agent, trust company or other organization responsible for safeguarding the assets of another person or entity, like a customer, clearing institutions 240, dealers 260 and prime brokers 265 via existing communications network 50, such as the Internet. Moreover, as illustrated in FIG. 2, the STP trading platform 100 preferably utilizes a distributed software application arrangement, as will be further described below in the "System Architecture" section of the present application, to provide the straight-through-processing ("STP") of trades. Although the exemplary embodiments described herein are described in terms of a distributed, networked software solution operative in a client-server environment, a wholly server-based or client-based approach could be adopted, so long as the system was configured to provide the functionality disclosed herein.

The Trading Cycle

A summary of the trading cycle will now be described. The typical trading cycle begins with traders for customers accessing indicative market pricing feeds, although, as described below, trades can be initiated through an internal order management system. Indicative market pricing feeds or composite price matrices, such as those shown and described herein, generally receive near real-time indicative pricing data from dealers. The price data is then input into a software algorithm to generate the composite price screen. The operation of the composite price algorithm is not critical to the present invention and, therefore, specifics of the algorithm are not discussed. The composite price screens are generated by the software algorithm operative of the STP trading platform servers (shown in FIG. 2 as servers 105) and communicated through a network 50 to both the customer and dealer computer systems 200, 260 and, if necessary, to the prime broker computer system 265.

With reference to FIG. 2, operative on the customer computer system 200 is a customer-side software client 210 that includes an electronic trading component 215 and a back-office management component 220. The customer-side software client 210 is configured to receive and display the composite price screens and to permit customer traders to create trade inquiries, search dealer offerings, receive dealer axes, execute trades, allocate trades, and perform various other back office functions, as further described below. The customer generally views a composite price screen so as to gather information relating to a particular fixed income instrument. Dealers may also view composite price screens to keep apprised of market trends. As described below, the customer can initiate a trade inquiry from the composite price screens.

In general, the STP trading platform 100 operates according to an inquiry-based trading environment. Thus, typically, a customer desiring to buy or sell financial instruments makes an electronic inquiry of one or more dealers for prices at which the instruments can be bought or sold. Because multiple dealers may be competing against one another, this type of inquiry is sometimes referred to as competitive auction-based inquiry. In other instances, for example, in the case of commercial paper offerings (CPOs), the STP trading platform 100 may be configured to operate according to an inventory-based trading environment in which dealers post inventories of various financial instruments from which customers can make purchases.

In the exemplary embodiment being described, dealers interact with a dealer-side software client 270 operative on the dealer system 260. Operating in connection with the electronic trading module 160 of the STP trading platform 100, an electronic trading component 275 of the dealer-side software client 270 permits dealers to receive trade inquiries from customers, create axes, manage the provision of market prices to customers in response to the inquiries through the STP trading platform 100, execute trades, receive customer allocations, confirm trade details and allocation instructions, generate confirmations, and perform other back office tasks.

Traders for the selected dealers receive inquiries through the STP trading platform 100 into the electronic trading component 275. The electronic trading component 275 operates to display customer-initiated inquiries on a graphical interface that provides dealers with the ability to input the requested bid/ask prices into an electronic trade ticket and transmit the prices to the customer. Dealers must typically present both bids and offers to customers so that customers can select to trade either side of a transaction. For instance, the dealer must provide bids that represent the price at which the dealer is willing to purchase a particular financial instrument from customers. Similarly, the dealer must post offers (or ask prices), which are the price at which the dealers are willing to sell particular financial instruments to customers. Moreover, according to known trading rules, dealers must make the prices they post firm for several seconds and, thus, the dealers will post prices "on the wire" for several seconds. If the customer selects a particular dealer's price while there is "on the wire" time remaining, then the dealer must honor the firm price and the transaction will automatically be accepted. A trade performed after the "on the wire" time has expired may be accepted or rejected at the dealer's sole discretion. Prior to a trade being performed after the "on the wire" time has expired, the dealer may refresh its trade price and reset the "on-the-wire" time.

Through a trade ticket interface (shown and described below) displayed by the dealer-side electronic trading component 275, dealers can provide market prices in response to customer inquiries and set specific "on the wire" time periods. Upon creation of a dealer price offer, an electronic message is created and an identifier is mapped to the dealer price offer so that a record of the offer can be stored in the trade history database 115 of the STP trading platform 100. The live market dealer price and "on the wire" time period is transmitted through the electronic trading module 160 of the STP trading platform 100 to the customer's computer 200 and displayed by the customer-side electronic trading component 215. Thus, the customer can see the selected dealers' prices, along with a countdown of "on the wire" time. Through the customer-side electronic trading component 215, the customer can "hit" a bid or "lift" an offer to initiate the purchase or sale, as applicable, of the selected financial product. This functionality is performed electronically, as described further below.

The STP trading platform 100 may also be configured to process trades executed on systems other than through the electronic trading module 160, such as trades executed via telephone or by an alternate electronic trading system. Trade details from alternate systems are electronically imported into the STP trading platform 100 so as to provide the straight-through-processing functionality described herein for trades executed using these alternate methods. Trade data regarding transactions effected on other systems is imported by dealers into the STP trading platform 100 using application programming interfaces (APIs) that link the two systems and through data transfer using standardized (e.g., FIX format) or customized formats, as described further below.

Further, in the exemplary embodiment, the STP trading platform 100 permits dealers to initiate trade inquiries using the dealer-side electronic trading component 215. Such dealer-generated trade inquiries are referred to as electronic axes. A dealer using axe generation functionality can input the material terms of an offer to trade a particular instrument. Unlike present systems that permit only non-executable messages, the dealer can set an "on the wire" time during which the trade will be accepted by a selected customer or group of customers at the dealer's terms. Once an electronic axe is created, the dealer can communicate the electronic axe using the STP trading platform 100 to one or more selected customers. If a customer accepts a dealer electronic axe, the trade is executed in the same manner as customer initiated inquiries.

After a transaction is effected through the electronic trading module 160 of the STP trading platform 100, or through an alternate electronic trading system or via telephone and imported into the STP trading platform 100, the customer may make any necessary account allocations to block trades. The functionality to allocate block trades to the customer's sub-accounts is provided through integration of the electronic trading module 160, along with the customer-side electronic trading component 215, and the account management module 120 and associated account management database 110. The account management module 120 includes, at least in part, an account management database 110 for the storage and maintenance of account and sub-account information for each of the customers' client's accounts. By selecting the "breakdown" functionality provided by the electronic trading module 160 and customer-side electronic trading component 215, the customer's account information can be retrieved from the account management database 110. A breakdown interface provided by the customer-side electronic trading component 215 is populated by account information retrieved from the account management database 110, which includes at least a sub-account database. Thus, through integration of the electronic trading module 160 and the account management module 120, the customer is provided functionality to selectively allocate the block trade to one or more sub-accounts. Once block trades are allocated, the customer-side electronic trading component 215 of the electronic trading module 160 can generate an allocation ticket for each allocation of the block trade. Thus, in essence, each allocation is treated for the purposes of allocation acknowledgement, electronic confirmation and settlement as a separate allocation ticket. Each allocation ticket contains an identifier that permits the electronic trading module 160 to store a data record for each allocation ticket in the trade history database 115. The allocation ticket also may contain an identifier linking it to the original block trade executed between the parties.

The electronic trading module 160 of the STP trading platform 100, through integration with the account management module 120, also has the functionality to permit the allocation of trades through the use of integrated inter-systems or order management systems of the customer. As will be discussed in greater detail below, the STP trading platform can be, and preferably is, communicatively linked to the internal systems of customers and dealers. As an example, many customers operate order management systems ("OMS") (shown in FIG. 2 as 222) to handle trade generation, portfolio management, and order routing. Customer software may also electronically handle sub-account allocation in an automated fashion. The STP trading platform 100 enables customers to initiate the trading process using OMS 222, and electronically allocate block trades executed on the STP trading platform 100 using associated software. In the exemplary embodiment, OMS systems 222 are linked to the STP trading platform 100 using an API, which permits allocation details, for example, to be imported into the STP trading platform 100, so that the allocation details can, in turn, be transmitted through the STP trading platform 100 to the dealer-side computers 260 for acknowledgement.

At this point, the trade details, which may include a summary of the block trade and the account information for the allocation, if applicable, may be enriched through interaction with the account management database of the STP trading platform 100. In the exemplary embodiment, the account management database 110 stores standing settlement instructions pertaining to each of the customer accounts. Thus, during the process of transmitting the trade details and allocations, if any, to the dealer-side computers 260, the electronic trading module 160 accesses the account management database 115 to retrieve the standing settlement instructions for each designated account of the trade, and adds the instructions to the trade details.

It should also be understood that the STP trading platform 100 is designed to record and store in the trade history database 115 a historical record of all transactions executed, including a historical audit trail of all phases of the trade cycle, to thereby facilitate problem resolution should any issues or disputes arise.

The confirmation process may also be performed on the STP trading platform 100. According to the exemplary embodiment, the STP trading platform 100 provides dealers with the ability to have confirmations electronically generated and transmitted to customers through the STP trading platform 100 in a manner that would satisfy the requirements of applicable government regulations, such as SEC Rule 10b-10. For transactions effected through the STP trading platform 100, the transaction information contained in the confirmation is based on the terms of the transaction that have been agreed to between the customer and the dealer over the STP trading platform 100.

Upon electronic receipt of the trade details, including any allocations and the associated settlement instructions, dealers can confirm that the trade details and the records of the customers are accurate. If the dealer determines that the details of the customer's allocations are accurate, then the dealer can acknowledge the allocation via the STP trading platform 100. The STP trading platform 100 then dynamically generates an electronic confirmation in accordance with applicable government regulations, for example, SEC Rule 10b-10, to facilitate the electronic confirmation of trades. As discussed above, the STP trading platform 100 is also preferably adapted to handle the processing and confirmation of trades executed either via telephone or via an alternate trading system.

For trades made on alternate trading systems, such as dealer trade management system 279 or via telephone, the confirmation is based on transaction information that is electronically imported into the STP trading platform 100 by the dealer and affirmed by the applicable customer. In each case, the affirmation reflects any allocation among sub-accounts that has been made by the customer and accepted by the dealer.

Further, in the exemplary embodiment, both the customers and dealers are provided access through a back office management module 140 of the STP trading platform 100 to a master trade blotter interface, as well as various other summary interfaces. On the customer-side, the summary interface preferably displays trade information on a dealer-by-dealer basis. The summary information preferably includes the number of trades, the number of trades cancelled or corrected, the number of block trades allocated or unallocated, the number of tickets generated, the number of trades confirmed or unconfirmed, and the number of trades for which there are errors. This summary interface allows back office personnel to quickly and efficiently determine whether any executed trades have outstanding issues that require attention. Similarly, the dealer-side has access to summary trade information on a customer-by-customer basis.

In one embodiment, the STP Trading Platform 100 further includes a prime broker software client 266 that includes an electronic trading component 267 and a back-office management component 268. The prime broker software client 266 is configured to receive and display trade details and permits prime brokers to view and approve trades and in one embodiment perform various other back office functions.

System Architecture

In an exemplary embodiment, as shown in FIG. 2, software modules 120, 140, 160 of the STP trading platform 100 are capable of communication with customer-side software application components 210 operative on customer computers 200 via a communications network 50. In a similar way, dealer-side software application components 270 are operable on dealer computers 260 and capable of communication with the STP trading platform servers 105. Similarly, prime broker software client 266 is operable on prime broker computers 265 and capable of communication with the STP trading platform servers 105. Together the software modules 120, 140, 160 operative on the STP trading platform servers 105 with the client-side, dealer-side, prime broker software modules 210, 270, 265 comprise the server-client software system of the STP trading platform 100.

In the exemplary embodiment, the client-side software application components 210, such as the customer-side electronic trading and back office management components 215, 220 the dealer-side electronic trading and back-office management components 275, 277 and the prime broker electronic trading and back-office management components 267, 268 are preferably "thin-clients". With respect to client/server applications, the term "thin-client" generally refers to a software client designed to be relatively small so that the bulk of the data processing occurs on the server. In the exemplary embodiment of the STP trading platform 100, the customer, dealer and prime broker electronic trading and back office management components 215, 220, and 275, 277 and 267, 268 respectively, are relatively small software applications capable of generating graphical user interface templates on the customer, dealer and prime broker computers, such as the exemplary graphical user interface templates shown in FIGS. 5-6, 8-18, which are populated and controlled, at least in part, by the software modules operative on the centralized STP trading platform servers 105 in communication with customer dealer and prime broker computers 200, 260 and 265. Persons of skill will recognize, however, that the use of thin-client technology, as opposed to other known and heretofore-developed client-server technologies, is not critical to the present invention.

Generally speaking, the electronic trading module 160 is operative on the STP trading platform servers 105 to communicate with and provide functionality to the dealer-side, customer-side and prime broker electronic trading components, which generate and display graphical user interfaces that are populated by information communicated from dealers (e.g., live market pricing data) and retrieved from the account management database 110 (e.g., account information and settlement instructions), as described further below.

The account management module 120 is also preferably a server-side software application operative on the STP trading platform servers 105 and accessible by customer, dealer and prime broker computers 200, 260, 265 via a communications network 50, such as the Internet. In the exemplary embodiment, the account management module 120 is database management software programmed with graphical interfaces to provide a web-based program that can display information retrieved from the account management database 110 via the Internet and create, update, modify or delete, as applicable, account records including settlement instructions. Via known communications networks, customers and dealers can access their accounts through the account management module 120 of the STP trading platform 100. Through integration of the STP trading platform modules 120, 140, 160, the account management database 110 is also accessible by the electronic trading module 160 so as to permit the electronic trading module 160 to retrieve information from the account management database 110, when necessary.

Customer dealer and prime broker computers 200, 260 and 265 are any type of personal or network computer such as an IBM-compatible computer running an Intel chipset and having an operating system, such as Microsoft® Windows® NT, 2000, XP, and the like, and, preferably, running a browser program such as Microsoft® Internet Explorer or Netscape Navigator®. It is also within the scope of the present invention that computers 200, 260 and 265 may be handheld or table computing devices, such as a personal digital assistant (PDA), pocket PC, and tablet PC, or the like. Computers 200, 260 and 265 have access to a communications network via a modem or broadband connection to permit data communication between the participants and the STP trading platform 100.

Various input and output devices are preferably provided with the customer dealer and prime broker computers 200, 260 and 265 including, by way of non-limiting example, a display (e.g., cathode ray tube (CRT), liquid crystal display (LCD), etc.), and an input device (e.g., a keyboard, mouse, touch pad, or light pen). The customer and dealer computers 200, 260 would also preferably include a storage device such as, for example, a magnetic disk drive and magnetic disk, a CD-ROM drive and CD-ROM, DVD, or other equivalent device. The specific hardware combination/configuration is not crucial to the instant invention, and may vary as a matter of design choice within the functional parameters disclosed herein. Users of the STP trading platform 100 typically interact with the GUI's displayed by the software modules by "clicking" on numbers or graphics (e.g., buttons) that are displayed on the GUI's. Persons of skill will understand that the present invention is not limited to clicking with a computer mouse, but includes use of any other device for indicating an action with graphics-based software, such as a touch pad, light pen, touch sensitive display screen and the like.

The STP trading platform servers 105 may be computer servers of any type known in the industry, but capable of handling the flow of data on a substantially real-time basis. Moreover, persons of skill will recognize that multiple servers in a server farm arrangement may be utilized to handle the bandwidth and processing requirements of a particular arrangement of the present invention.

Trade history databases 115 and account management databases 110 are controlled by the software modules 120, 140, 160 to retrieve data, when necessary. The storage devices themselves may be any mass storage devices capable of storing large amounts of data in an organized fashion, such as known data storage devices including, but not limited to hard disks, tape drives, optical disks and the like.

Communication between the customer-side, dealer-side, prime-broker side and the STP trading platform 100 may be accomplished via electronic messaging using the Extensible Mark-up Language ("XML"), Financial Information Exchange ("FIX") or Financial Products Mark-up Language ("FpML") format. In order for customer-side, dealer-side and prime broker side computers 200, 260, 265 to communicate with the STP trading platform 100, an API is provided to enable users to establish connections to the STP trading platform 100, authenticate their systems, and exchange messages using, for example, the XML-based messaging protocol. By way of non-limiting example, Table I that follows illustrates exemplary messages that may be used during the flow of the trading cycle.

TABLE I

EXEMPLARY MESSAGES

| Message Type | Fields | Components |
|---|---|---|
| PlaceOrder | OurOrderRef | Alphanumeric ID code |
| | YourOrderRef | Alphanumeric ID code |
| | OldOrderRef <required if Type = correct> | Alphanumeric ID code |
| | OrderListRef | Alphanumeric ID code (if Target=List) |
| | TransactTime <time stamp for order> | yyyy-mm-ddThh:mm:ss |
| | Type | +New |
| | | +Correct |
| | Target | +AlertBook |
| | | +Ticket |
| | | +List |
| | Order | (if outright) |
| | | +Side |
| | |   +Buy |
| | |   +Sell |
| | |   +SellShort |
| | | +Quantity = decimal |
| | | +MinimumQuantity = decimal |
| | | +ShowQuantity = decimal |
| | | +LotSize = decimal |
| | | +Replenish |
| | | +Instrument (see Table II) |
| | | +Settlement (see Table II) |
| | | +StipulationList |
| | | +AllocationList (if breakdown provided) |
| | |   +Account ID |
| | |   +Quantity = decimal |
| | |   +ClearingLoc (if non-US) |
| | | +ClearingLoc (if non-US) |
| | | +Benchmark |
| | |   +ID |
| | |     +Type |
| | |       +CUSIP |
| | |       +ISIN |
| | |       +SEDOL |
| | |       +ISDA |
| | |       +Private |
| | |       +Tosho |
| | |       +WKN |
| | |       +REDID |
| | |       +IndexName |
| | |     +Code |
| | | +WhenIssued |
| | | +Curve |
| | | +Point |
| | | +PositionEffect |
| | |   +Open |
| | |   +Roll |
| | |   +Close |
| | | +TaxStatus |
| | |   +Clean |
| | |   +Dirty |
| | OrderList | +Order array (if swap or butterfly) |
| | |   +Side |
| | |     +Buy |
| | |     +Sell |
| | |     +SellShort |
| | |   +Quantity = decimal |
| | |   +Instrument (see Table II) |
| | |   +Settlement (see Table II) |
| | |   +StipulationList |
| | |   +AllocationList |
| | |     (if breakdown provided) |
| | |     +Account ID |
| | |     +Quantity = decimal |
| | |     +ClearingLoc (if non-US) |
| | |   +ClearingLoc (if non-US) |
| | |   +Benchmark |
| | |     +ID |
| | |       +Type |
| | |         +CUSIP |
| | |         +ISIN |

TABLE I-continued

EXEMPLARY MESSAGES

| Message Type | Fields | Components |
|---|---|---|
| | | +SEDOL |
| | | +ISDA |
| | | +Private |
| | | +Tosho |
| | | +WKN |
| | | +REDID |
| | | +IndexName |
| | | +Code |
| | | +WhenIssued |
| | | +Curve |
| | | +Point |
| | | +PositionEffect |
| | | +Open |
| | | +Roll |
| | | +Close |
| | | +TaxStatus |
| | | +Clean |
| | | +Dirty |
| | OrderType | +Auction |
| | | +MyPrice |
| | | +Limit |
| | | +Stop |
| | | +AtClose |
| | ExpireTime | hh:mm:ss |
| | | <if OrderType=Stop or Limit> |
| | Price <if OrderType = MyPrice> | +Type |
| | | +Percent |
| | | +PerUnit |
| | | +Yield |
| | | +Type <e.g. Maturity> |
| | | +Value |
| | | +Discount |
| | | +Premium |
| | | +Spread |
| | | +Value |
| | | +NormalValue |
| | Capacity | +Agent |
| | | +Principal |
| | Trader <email address of trader> | String text |
| | LocateDealer | BIC of SellShort locate broker/dealer |
| | Dealer | BIC of exclusive dealer |
| | DealerList | Array of BICs of participating dealers |
| | BlockedDealerList | Array of BICs of dealers not allowed to participate |
| | Note | String text - returned to buy-side firm |
| | DealerNote | String text - forwarded to dealer |
| Allocate | OurOrderRef | Alphanumeric ID code |
| | YourOrderRef | Alphanumeric ID code |
| | TWTradeRef | +Date (yymmdd) |
| | | +Product (TW proprietary code) |
| | | +Dealer (TW proprietary acronym) |
| | | +Number |
| | | +SecurityType (TW proprietary code) |
| | Type | +New |
| | | +Correct |
| | TransactTime <time stamp for order> | yyyy-mm-ddThh:mm:ss |
| | OurAllocationRef | Alphanumeric ID code |
| | OldAllocationRef <required if Type = correct> | Alphanumeric ID code |
| | ExecutionNotificationRef <system ID> | Alphanumeric ID code |
| | Trade | +Side |
| | | +Buy |
| | | +Sell |
| | | +SellShort |
| | | +Quantity = decimal |
| | | +Instrument (see Table II) |
| | | +Settlement (see Table II) |
| | | +Price (see above) |
| | | +Trader <email address> |
| | | +Dealer (BIC) |
| | | +OurDealerOasysAcronym |
| | | +OurDealerOmgeoTradesuiteID |
| | | +TradeDate (yyyy-mm-dd) |

TABLE I-continued

EXEMPLARY MESSAGES

| Message Type | Fields | Components |
|---|---|---|
| | TotalAllocs | total count for multi-page orders |
| | LastFragment | last page flag |
| | AllocationList | +Allocation array |
| | |   +Account ID |
| | |   +Quantity = decimal |
| | |   +ClearingLoc (if non-US) |
| | |   +GiveUpBroker (BIC) |
| | |   +StepOutBroker (BIC) |
| | |   +GTSBroker (BIC) |
| | |   +AllocRef |
| | |   +Note |
| | Note | String text |
| Booking Notification | NotificationRef | Alphanumeric ID code |
| | OurOrderRef | Alphanumeric ID code |
| | YourOrderRef | Alphanumeric ID code |
| | OrderListRef | Alphanumeric ID code (if List trade) |
| | DealerOrderRef | Alphanumeric ID code (if known) |
| | TransactTime <time stamp for order> | yyyy-mm-ddThh:mm:ss |
| | Type | +New |
| | | +Correct |
| | TWTradeRef | +Date (yymmdd) |
| | | +Product (TW proprietary code) |
| | | +Dealer (TW proprietary acronym) |
| | | +Number |
| | | +SecurityType (TW proprietary code) |
| | YourAllocationRef | Alphanumeric ID code |
| | Status | +BookingStatus |
| | |   +Affirmed |
| | |   +UnknownAccount |
| | |   +MissingInstructions |
| | |   +Canceled |
| | |   +Other - explanation in Notes |
| | Trade | +Side |
| | |   +Buy |
| | |   +Sell |
| | |   +SellShort |
| | | +PositionEffect |
| | |   +Open |
| | |   +Roll |
| | |   +Close |
| | | +MultilegComponent |
| | | +Quantity = decimal |
| | | +Instrument (see Table II) |
| | | +Settlement (see Table II) |
| | | +StipulationList |
| | | +Account ID |
| | | +ClearingLoc (if non-US) |
| | | +DealerClearingID |
| | | +Price (see above) |
| | | +PrincipalAmount |
| | | +AccruedInterest |
| | | +NetMoney |
| | | +Customer ID |
| | | +TWBranch |
| | | +Capacity |
| | |   +Agent |
| | |   +Principal |
| | | +Trader <email address> |
| | | +Dealer (BIC) |
| | | +GiveUpBroker |
| | | +StepOutBroker |
| | | +GTSBroker |
| | | +TaxStatus |
| | |   +Clean |
| | |   +Dirty |
| | | +Market (MIC) |
| | | +Location (of trade) |
| | | +TradeDate (yyyy-mm-dd) |
| | | +TWAllocationNumber |
| | | +TraderFull |
| | |   +TWUserID |
| | |   +EmailAddress |

TABLE I-continued

EXEMPLARY MESSAGES

| Message Type | Fields | Components |
|---|---|---|
| | | +FirstName |
| | | +MiddleInitial |
| | | +LastName |
| | Note | String text |

TABLE II

EXEMPLARY COMPONENT CLASSES

| Type | Fields | Components |
|---|---|---|
| Instrument | ID | +SecurityIDType |
| | |   +CUSIP |
| | |   +ISIN |
| | |   +SEDOL |
| | |   +ISDA |
| | |   +Private |
| | |   +Tosho |
| | |   +WKN |
| | |   +REDID |
| | |   +IndexName |
| | | +Code (string) |
| | AltIDList | SecurityID array of synonyms |
| | Description | (string) |
| | Currency | (ISO-4217 values) |
| AmortizableInstrument <implementation> | Product | +MORTGAGE |
| | Security | +MBS |
| | | +PFAND |
| | Issuer | (string) |
| | Country | (ISO-3166 values) |
| | Coupon | |
| | Issued | yyyy-mm-dd |
| | Dated | yyyy-mm-dd |
| | Maturity | yyyy-mm-dd |
| | Factor | |
| | PreFactored | (Boolean) |
| | Term | |
| CouponInstrument <implementation> | Product | +GOVERNMENT |
| | | +AGENCY |
| | | +CORPORATE |
| | | +MONEYMARKET |
| | Security | +CAN |
| | | +CB |
| | | +CMB |
| | | +CORP |
| | | +EUCORP |
| | | +EUFRN |
| | | +EUSOV |
| | | +EUSUPRA |
| | | +FAC |
| | | +FRN |
| | | +PROV |
| | | +SUPRA |
| | | +TCAL |
| | | +TD |
| | | +TINT |
| | | +TIPS |
| | | +TN |
| | | +TPRN |
| | | +UST |
| | Issuer | (string) |
| | Country | (ISO-3166 values) |
| | Ticker | (string) |
| | Coupon | |
| | Issued | yyyy-mm-dd |
| | Dated | yyyy-mm-dd |
| | Maturity | yyyy-mm-dd |
| | Factor | |

TABLE II-continued

EXEMPLARY COMPONENT CLASSES

| Type | Fields | Components |
|---|---|---|
| | PreFactored | (Boolean) |
| | WhenIssued | (Boolean) |
| | InterestBearing | (Boolean) |
| | FloatingRate | |
| | ExDividend | (Boolean) |
| | Term | |
| DerivativeInstrument <implementation> | Product | +DERIVATIVE |
| | Security | +IRS |
| | | +CDS |
| | TradeType | +Benchmark |
| | | +OffBenchmark |
| | | +Forward |
| | | +New |
| | | +Assignment |
| | | +Termination |
| | Start | yyyy-mm-dd |
| | End | yyyy-mm-dd |
| | FpMLContent | (FpML standard trade confirmation) |
| DiscountInstrument <implementation> | Product | +GOVERNMENT |
| | | +AGENCY |
| | | +MONEYMARKET |
| | | +MUNICIPAL |
| | Security | +BA |
| | | +BDN |
| | | +BN |
| | | +CAMM |
| | | +CP |
| | | +CTB |
| | | +EUCP |
| | | +FADN |
| | | +LQN |
| | | +PN |
| | | +SLQN |
| | | +TB |
| | | +TD |
| | | +TLQN |
| | | +TMCP |
| | | +USTB |
| | | +XCN |
| | Issuer | (string) |
| | Country | (ISO-3166 values) |
| | Issued | yyyy-mm-dd |
| | Dated | yyyy-mm-dd |
| | Maturity | yyyy-mm-dd |
| | WhenIssued | (Boolean) |
| | Term | |
| EquityInstrument <implementation> | Product | +EQUITY |
| | Security | +CS |
| | | +PS |
| | Issuer | (string) |
| | Country | (ISO-3166 values) |
| | Ticker | (string) |
| FinancingInstrument <implementation> | Product | +FINANCING |
| | Security | +REPO |
| | UnderlyingSecurity | +TREASURY |
| | | +MORTGAGE |
| | | +AGENCY |
| | | +OTHER |
| | UnderlyingMaturityRange | +0Y-1Y |
| | | +1Y-5Y |
| | | +5Y-10Y |
| | | +10Y-30Y |
| | UnderlyingSchedule | (string) |
| | UnderlyingType | +STRIPS |
| | Country | (ISO-3166 values) |
| | TerminationType | +Overnight |
| | | +Term |
| | | +Flexible |
| | | +Open |
| | Start | yyyy-mm-dd |
| | End | yyyy-mm-dd |

TABLE II-continued

EXEMPLARY COMPONENT CLASSES

| Type | Fields | Components |
| --- | --- | --- |
| FutureInstrument <implementation> | Product | +MORTGAGE |
| | Security | +TBA |
| | Issuer | (string) |
| | Country | (ISO-3166 values) |
| | Contract | yyyy-mm |
| | Coupon | |
| | Maturity | yyyy-mm-dd |
| Settlement | SettlementType | +Cash |
| | | +Regular |
| | | +NextDay |
| | | +T2 |
| | | +T3 |
| | | +T4 |
| | | +T5 |
| | | +WhenIssued |
| | | +Future |
| | Date | yyyy-mm-dd |

With respect to the exchange of messages between the customer-side, dealer-side, prime broker-side and STP trading platform 100, persons of skill in the art will recognize and understand the various message types being communicated across the system in light of the discussion of trade execution, allocation, confirmation, and settlement on the STP trading platform 100 in connection with the various screen shots and data flow diagrams. Persons of skill will also recognize that the particular structure of the messages and the preferred use of XML messaging is not necessary and alternate methods of messaging may be utilized.

Persons of skill in the art will further recognize that the exemplary system architecture shown and described herein may be modified in various manners so as to achieve the functionality set forth herein. Moreover, the particular layout or look and feel of the GUI's depicted in FIGS. 5, 6, 8-18, are meant only for illustration purposes and the scope of the present invention should not be so limited.

System Functionality

The above described account management, electronic trading, and back office modules 120, 140, 160 and the customer, dealer and prime broker electronic trading and back-office management clients 215, 220 and 275, 280 and 267 and 268, respectively are configured on the trading platform servers 105 and databases 110, 115 act cooperatively to provide a solution for various aspects of the typical trading cycle. An exemplary embodiment of customer dealer and prime broker interaction with the STP trading platform 100 is described below in connection with FIGS. 5-20.

1. Account Management

Prior to initiating a trade, a customer may access the account management module 120 of the STP trading platform 100 so as to input information to create, maintain, and update sub-accounts for allocation of block trades and to enter standing settlement instructions to facilitate electronic settlement of executed trades in accordance with an exemplary embodiment of the present invention. The STP trading platform 100 is operative with the account management database 110 to act as a centralized account management database for customers, dealers, custodians, and agent bank accounts and sub-accounts, and to store standing settlement instructions for said customers, custodians, and agent banks.

Figure 5:
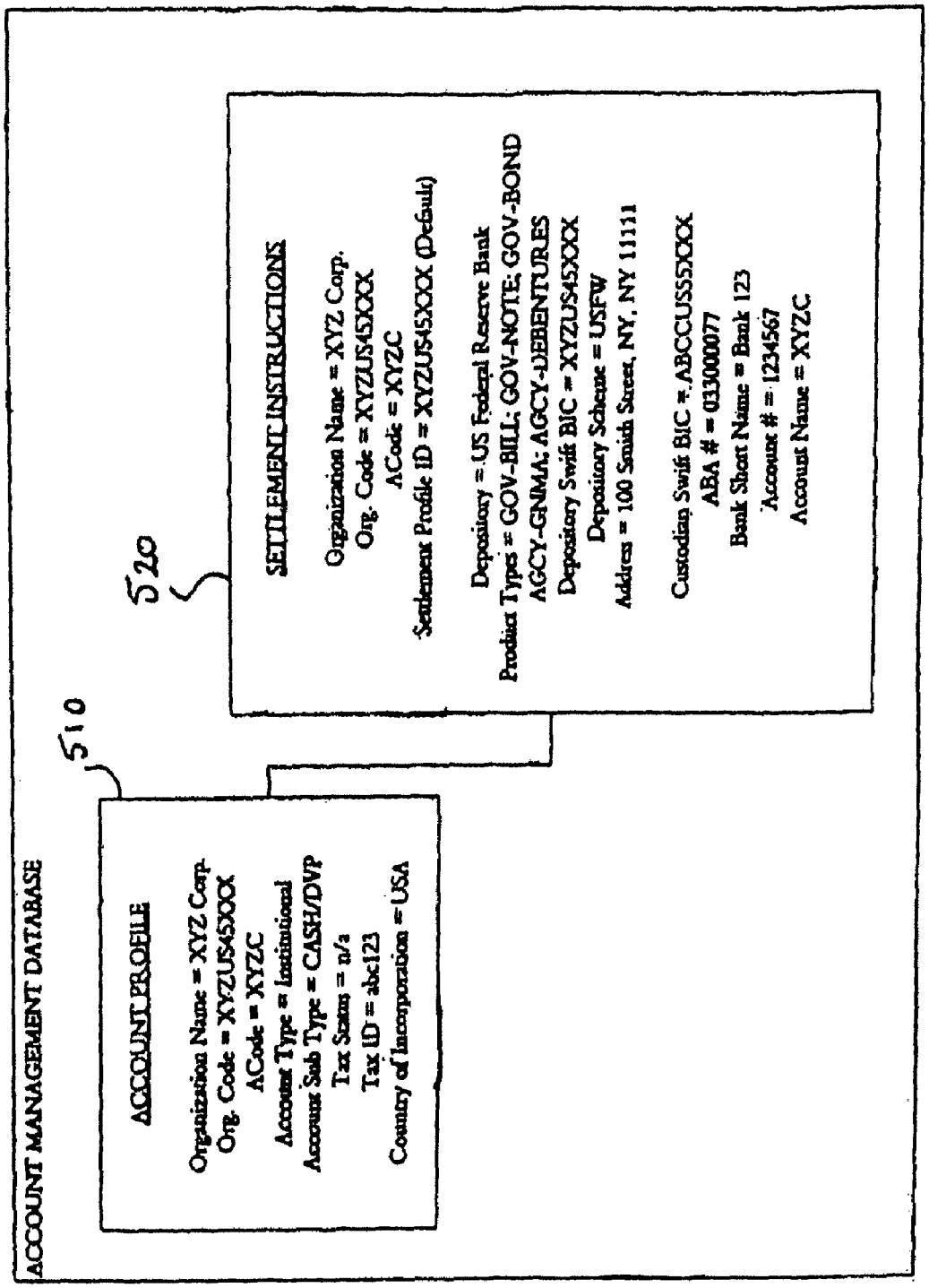
FIG. 5 is an exemplary database schematic for use with the STP trading platform.

In the exemplary embodiment, the account management module 120 is operative to create a web-based environment through which users can access settlement and account data, and manage standing settlement instructions. The account management module 120 also preferably performs account validation, as described further below. FIG. 5 is an example of a database schematic 500 of the account management database 110 for storing company account profiles 510 and corresponding settlement instructions 520. The account profiles and associated settlement instructions stored in the account management database 110 are mapped to the account information utilized by the electronic trading module 160. In this way, trade details can be enriched dynamically with account and settlement information from the account management database 110. In an exemplary embodiment, customers can interact with the account management module 120 of the STP trading platform 100 through a web-based interface 600 as shown in FIG. 6, to manage and update their account information. The account management interface 600 is preferably standardized and provides field level validation to reduce the possibility of errors in the account information. For example, the account management interface 600 has a minimum standard for information that must be entered in order to create a new account or sub-account. The minimum information requirement is driven by industry standards for the particular jurisdiction and financial product that the account is being created to accommodate. Where possible, to provide further ease of use and prevent errors, the account management interface 600 uses drop-down menus that users can select from pre-defined lists.

For example, according to the U.S.A. PATRIOT ACT (the "United and Strengthening America by Providing Appropriate Tools Required to Intercept and Obstruct Terrorism Act"), accounts in the United States must have a Tax ID number. The account management module 120, therefore, requires a Tax ID number to be entered for any account created in the United States.

Moreover, to accomplish field level validation, the account management module 120 is programmed to ensure that particular fields require particular types of information. For example, with reference to FIG. 6, the "TAX ID" field 610 generally requires an 8-digit numeric-code. In an exemplary embodiment, after the customer has completed entering the account information, the account management module 120 is configured to check the entered information against field level validation standards stored in a field level validation database to determine whether any information has been improperly entered. By way of example, if only 6-digits have been entered in the "TAX ID" field 610, the account management module 120 would detect the error and prompt the customer to enter the proper information. In an alternate embodiment, the account management module 120 could trigger a message to the customer as soon as improperly, non-validated information was entered into the system. In such a scenario, for example, as soon as the information was entered and the "tab" or "enter" key was pressed to move to the next input field, the account management module 120 would notify the user of the error.

In an exemplary embodiment, the account management database 110 also stores standing settlement instructions using a standardized and field level validated data structure. With reference again to FIG. 6, there is shown an exemplary embodiment of a customer account management interface 600 showing standing settlement instructions for a particular clearing institution and particular financial instruments. Because dealers use this information to settle securities transactions, its accuracy is important to achieving straight-through-processing. It should be understood that the information entered into the fields is illustrative and not meant to be indicative of actual settlement instructions. Input of standing settlement instructions using the account management module 120 is performed using industry-standardized data. For example, where possible, SWIFT codes are used to populate data fields. For instance, if a hypothetical SWIFT code of "ABCCUS33XXX" is entered, the other fields necessary to complete the creation of the settlement instructions are automatically populated using cross-references to the SWIFT codes embedded in the account management database 110. Such standardization and automation reduces the possibility of human input errors, which are a source of costly trade settlement failures. The account management module 120 may also perform field level validation on fields that are not able to be auto-populated using embedded cross-references in the same manner, as described above in connection with FIG. 6.

As a result of the standardization and validation performed by the account management module 120 in the creation and input of accounts, customers dealers and, if necessary, prime brokers have access to an accurate and centralized depository of account and sub-account information and associated settlement instructions. When a customer updates, creates anew, or modifies an account or settlement instruction, the changes will be almost immediately available to all participants that the customer has enabled to view such settlement instructions, thereby streamlining the process of updating account information and eliminating the need for duplicative systems and processes. Moreover, because the selected participants have access to the same information, errors can be detected and corrected more efficiently. As will be described further below, integration of the account management module 120 and database with the electronic trading module 160, and back office management module 140 provides the functionality for straight-through-processing of trades throughout the entire trading cycle.

2. Trade Execution—Customer Initiated Inquiries

Figure 3:
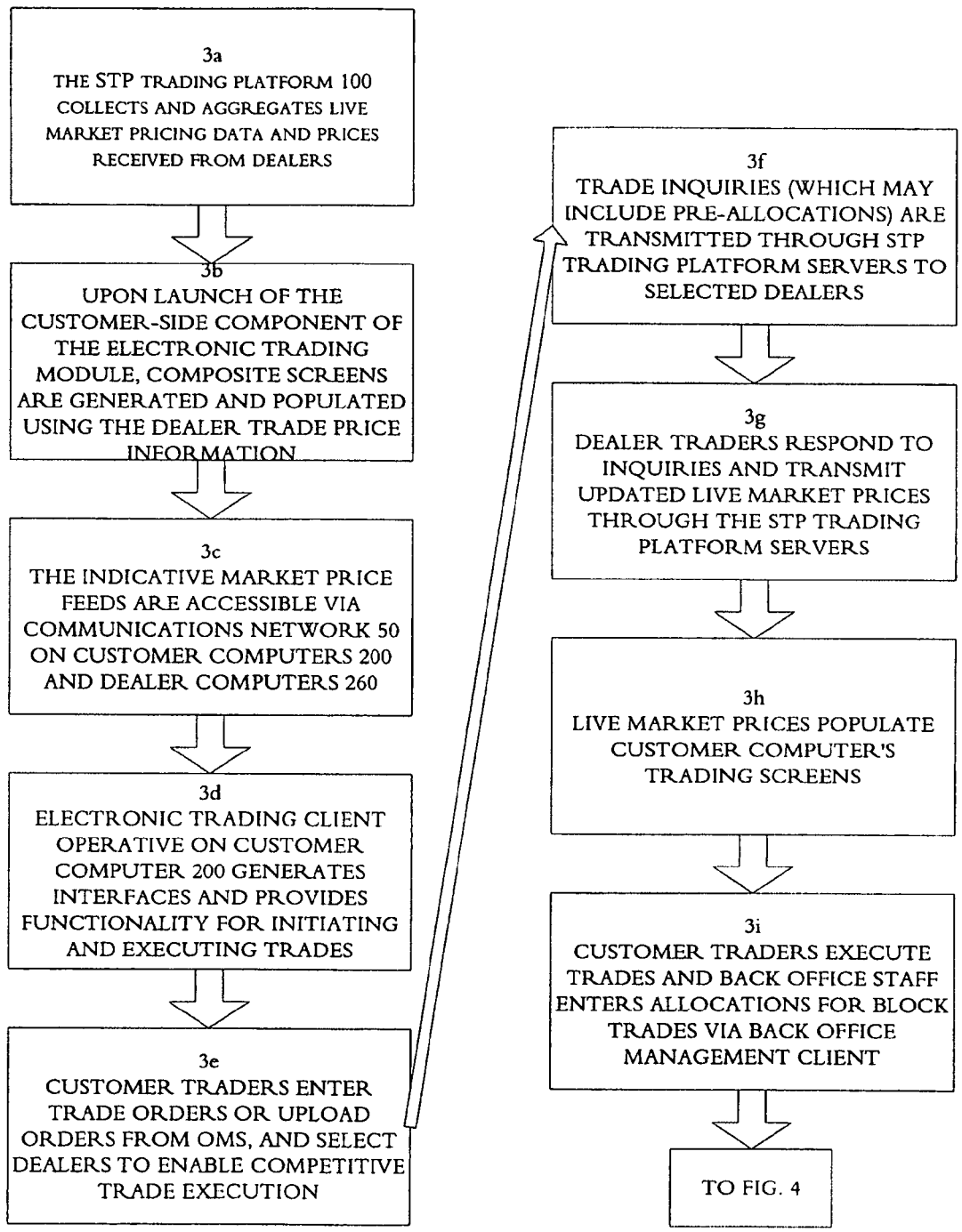
FIGS. 3 and 4 are flow diagrams depicting an exemplary flow of data between customer and dealer through the STP trading platform.
Figure 4:
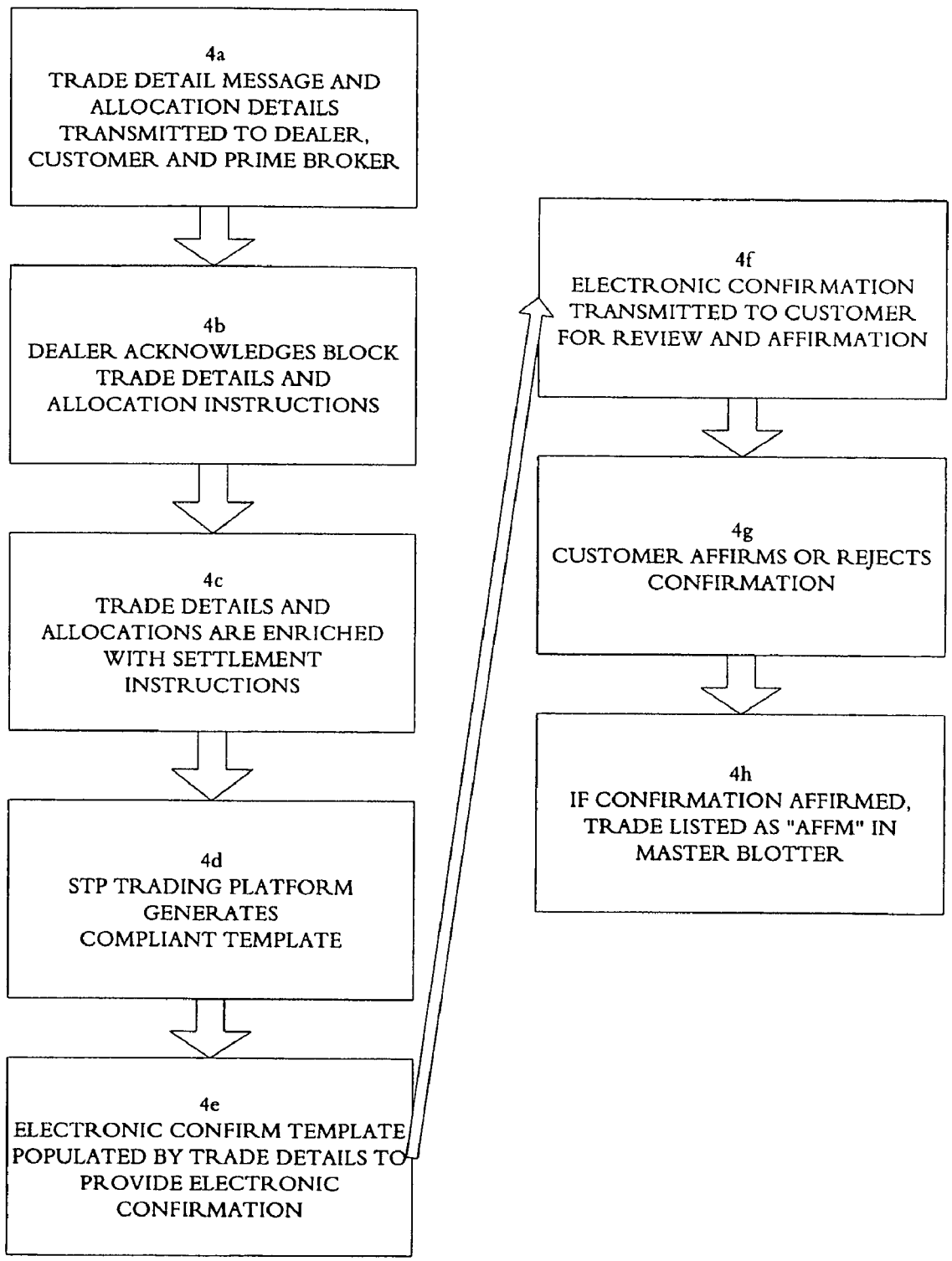

With reference now to FIGS. 3 and 4, there will be described an exemplary process for executing trades, allocating the trades, and confirming the trade details and allocations on the STP trading platform 100.

FIGS. 3 and 4 are data flow diagrams depicting an exemplary flow of data between customer and dealers through the STP trading platform 100 to effect a trade. In one embodiment, trade orders can be initiated through electronic submission from an internal order management system ("OMS"). In order to electronically submit orders through the OMS, the customer-side computers 200 communicate with OMS using a defined communication protocol supported by an API. Preferably, but not necessarily, the Financial Information Exchange ("FIX") protocol is utilized to facilitate communication between the OMS and the customer-side electronic trading component 215 of the customer-side computers 200, and in turn the STP trading platform 100. Table III shows two exemplary messages for importing new order messages from OMS:

TABLE III

EXEMPLARY NEW ORDER MESSAGES

| Message Type | Fields | FIX Tag I | FIX Tag II |
|---|---|---|---|
| New Order | ClOrderID <customer assigned order ID> | 11 | 11 |
| | TransactTime <time stamp for order> | 60 | 60 |
| | HandlInst <Required by FIX protocol> | 21 | 21 |
| | TimeInForce | 59 | 59 |
| | ExpireTime | 126 | 126 |
| | Symbol <FIXED or [N/A]> | 55 | 55 |
| | Side <Buy/Sell/SellShort> | 54 | 54 |
| | PositionEffect<for deposits> | 77 | 77 |
| | OrderQty <par value order size> | 38 | 38 |
| | MinQty | 110 | 110 |
| | MaxFloor | 111 | 111 |
| | LotSize | 6603 | 6603 |
| | Replenish | 6604 | 6604 |
| | SecurityID <CUSIP, SEDOL, ISIN, Private, Tosho, REDID, IndexName> | 48 | 48 |
| | IDSource <CUSIP, SEDOL, ISIN, Private, Tosho, REDID, IndexName> | 22 | 22 |
| | Product <high level security class code; e.g., AGENCY CORPORATE EQUITY GOVERNMENT MONEYMARKET MORTGAGE MUNICIPAL OTHER FINANCING | 6613 | 460 |

TABLE III-continued

EXEMPLARY NEW ORDER MESSAGES

| Message Type | Fields | FIX Tag I | FIX Tag II |
|---|---|---|---|
| | SecurityType <security classification; e.g., CORP = Corporate Bonds CP = Commercial Paper MBS = Mortgage-Backed Securities TBA = TBA Mortgages UST = US Treasury Note/Bond | 6609 | 167 |
| | Issuer | 106 | 106 |
| | CouponRate <percentage> | 223 | 223 |
| | MaturityDate <YYYYMMDD> | 6637 | 541 |
| | Term | 6664 | 6664 |
| | IssueDate <YYYYMMDD> | 6620 | 225 |
| | DatedDate <YYYYMMDD> | 6659 | 873 |
| | ContractSettlmntMonth <used for TBAs> | 6689 | 667 |
| | SecurityDesc | 107 | 107 |
| | Currency <currency code, default = USD> | 15 | 15 |
| | BenchmarkSecurityID | 6693 | 699 |
| | BenchmarkSecurityIDSource | 6646 | 761 |
| | SettlementType | 63 | 63 |
| | FutSettDate <YYYYMMDD> | 64 | 64 |
| | TaxStatus | 6733 | 6733 |
| | Account <account ID> | 1 | 1 |
| | LocateReqd | 114 | Identified in NoPartyIDs repeating group - 453, 448, 447, 452 |
| | ClearingFirm <required for non-US issues> | 439 | |
| | LocateBroker | 5700 | |
| | ExecBroker | 76 | |
| | TraderID <email address of trader> | 6606 | |
| | NoAllocs <indicates # of allocation groups> | 78 | 78 |
| |    AllocAccount <Account ID for allocation> | 79 | 79 |
| |    IndividualAllocID | — | 467 |
| |    AllocText | 161 | 161 |
| |    AllocQty <allocation amount> | 80 | 80 |
| |    AllocClearingFirm <overrides "ClearingFirm"> | 6638 | Identified in NoNestedPartyIDs repeating group - 539, 524, 525, 538 |
| | Stipulations | 6634, 6635, 6636 | 232, 233, 234 |
| | OrdType <auction or customer bid/offer> | 40 | 40 |
| | Price <required for customer bid/offer> | 44 | 44 |
| | OrderCapacity <agency/principal> | 47 | 47 |
| | BlockedDealers | 10000, 10001 | 10000, 10001 |
| | Text | 58 | 58 |
| | DealerNote | 6732 | 6732 |

Persons of skill will recognize that other fields may be utilized as appropriate for the trade type (e.g., swaps) or particular security being traded. In addition, other fields defined by the FIX protocol may be utilized as a matter of design choice.

It will also be evident from the above table that a customer may pre-allocate trades on the system or through its internal OMS and include such allocations in the new order message to the databases. If the customer chooses to create allocations after a block trade is entered, then an allocation message is created. Table IV shows two exemplary messages for transmitting post-trade allocations using the FIX protocol:

TABLE IV

EXEMPLARY ALLOCATION MESSAGE

| Message Type | Fields | FIX Tag I | FIX Tag II |
|---|---|---|---|
| Allocation | AllocID <customer generated ID> | 70 | 70 |
| | AllocTransType <new, replacement, cancel> | 71 | 71 |
| | AllocType <Preliminary> | — | 626 |
| | TransactTime <date and time of trade> | 60 | 60 |
| | NoOrders <number of orders combined for allocation> | 73 | 73 |

TABLE IV-continued

EXEMPLARY ALLOCATION MESSAGE

| Message Type | Fields | FIX Tag I | FIX Tag II |
|---|---|---|---|
| | ClOrdID <Order ID assigned to trade> | 11 | 11 |
| | SecondaryOrderID | 198 | 198 |
| | NoExecs <number of executions combined for allocation> | 124 | 124 |
| | LastQty <size of referenced execution> | 32 | 32 |
| | ExecID <ID assigned to execution> | 17 | 17 |
| | LastPx <price of referenced execution> | 31 | 31 |
| | Symbol <FIXED or [N/A]> | 55 | 55 |
| | Side <Buy/Sell/SellShort> | 54 | 54 |
| | OrderQty <par value order size> | 38 | 38 |
| | SecurityID <CUSIP, SEDOL, ISIN, Private, Tosho, REDID, IndexName> | 48 | 48 |
| | IDSource <CUSIP, SEDOL, ISIN, Private, Tosho, REDID, IndexName> | 22 | 22 |
| | Product <high level security class code; e.g., AGENCY CORPORATE EQUITY GOVERNMENT MONEYMARKET MORTGAGE MUNICIPAL OTHER FINANCING | 6613 | 460 |
| | SecurityType <security classification; e.g., CORP = Corporate Bonds CP = Commercial Paper MBS = Mortgage-Backed Securities TBA = TBA Mortgages UST = US Treasury Note/Bond | 6609 | 167 |
| | CouponRate <percentage> | 223 | 223 |
| | MaturityDate <YYYYMMDD> | 6637 | 541 |
| | IssueDate <YYYYMMDD> | 6620 | 225 |
| | DatedDate <YYYYMMDD> | 6659 | 873 |
| | ContractSettlmntMonth <used for TBAs> | 6689 | 667 |
| | SecurityDesc | 107 | 107 |
| | Currency <currency code, default = USD> | 15 | 15 |
| | SettlementTyp | 63 | 63 |
| | FutSettDate <YYYYMMDD> | 64 | 64 |
| | AvgPx <average price at which accumulated executions took place, percentage> | 6 | 6 |
| | Trade Date <the trade date as per FIX specification> | 75 | 75 |
| | TraderID | 6606 | Identified in NoPartyIDs repeating group - 453, 448, 447, 452 |
| | Dealer's Oasys Acronym | — | |
| | Dealer's Omgeo Tradesuite ID | — | |
| | NoAllocs <indicates # of allocation groups> | 78 | 78 |
| | AllocAccount <Account ID for allocation> | 79 | 79 |
| | AllocQty <allocation amount> | 80 | 80 |
| | ExecBroker <counterpart to trade, BIC> | 76 | Identified in NoNestedPartyIDs repeating group - 539, 524, 525, 538 |
| | AllocGiveUpBroker | 6618 | |
| | AllocGTSBroker | 6619 | |
| | AllocStepOutBroker | 6648 | |
| | AllocClearingFirm <overrides "ClearingFirm"> | 6638 | |
| | Text | 58 | 58 |

The exemplary flow of FIG. 3 depicts a trade initiated via the composite price matrices. In a first step 3a, the STP trading platform 100 collects and aggregates live market pricing data and prices received from dealers. In step 3b, upon launch of the customer-side electronic trading component 215, composite screens are generated and populated using the dealer trade price information transmitted to the STP trading platform 100 by dealer systems. In step 3c, the indicative market price feeds are accessible via communications network 50 on customer computers 200 and dealer computers 260. In step 3d, the electronic trading component 215 operative on customer computer 200 generates graphical interfaces and provides functionality for initiating and executing trades. In step 3e, customer traders manually enter trade orders or electronically upload orders from OMS that would include allocation instruction, and select dealers to enable a competitive, auction-type trade inquiry. Trade inquiries are then transmitted through the STP trading platform 100 servers to the selected dealer's computers 260, in step 3f. These inquiries include information related to the customer's prime broker if a prime broker is to be used for the transaction. In most instances automated dealer trade systems, in step 3g, respond to the inquiries and transmit firm market prices through the STP trading platform servers 105. Using a trade execution screen, in step 3h, the firm dealer prices populate the customer's trading screens. In step 3i, customer traders can execute trades by hitting or lifting a bid or offer, as applicable. After a trade is accepted by the dealer, the customer's back office can enter block trade allocations if the trade was not already pre-allocated, and transmit the same to the customer computers 200 the dealer computers 260 and the prime broker computers 265, in step 4*a*. In step 4*b*, the dealer acknowledges the customer's block trade allocation.

Upon receipt of the customer's allocations, if any, the dealer-side software client 270 confirms the details of the block trade and allocations and retrieves standing settlement instructions from the account management database 110, and may, but not necessarily, generate an electronic confirmation of the trade. Throughout the process outlined in FIGS. 3 and 4, records of the customer's trade inquiry, the dealer's price response, details concerning whether prices were rejected or accepted, the final trade details, the customer's account allocations, if any, any prime broker information and electronic confirmations are stored in the trade history database 115.

Figure 7:
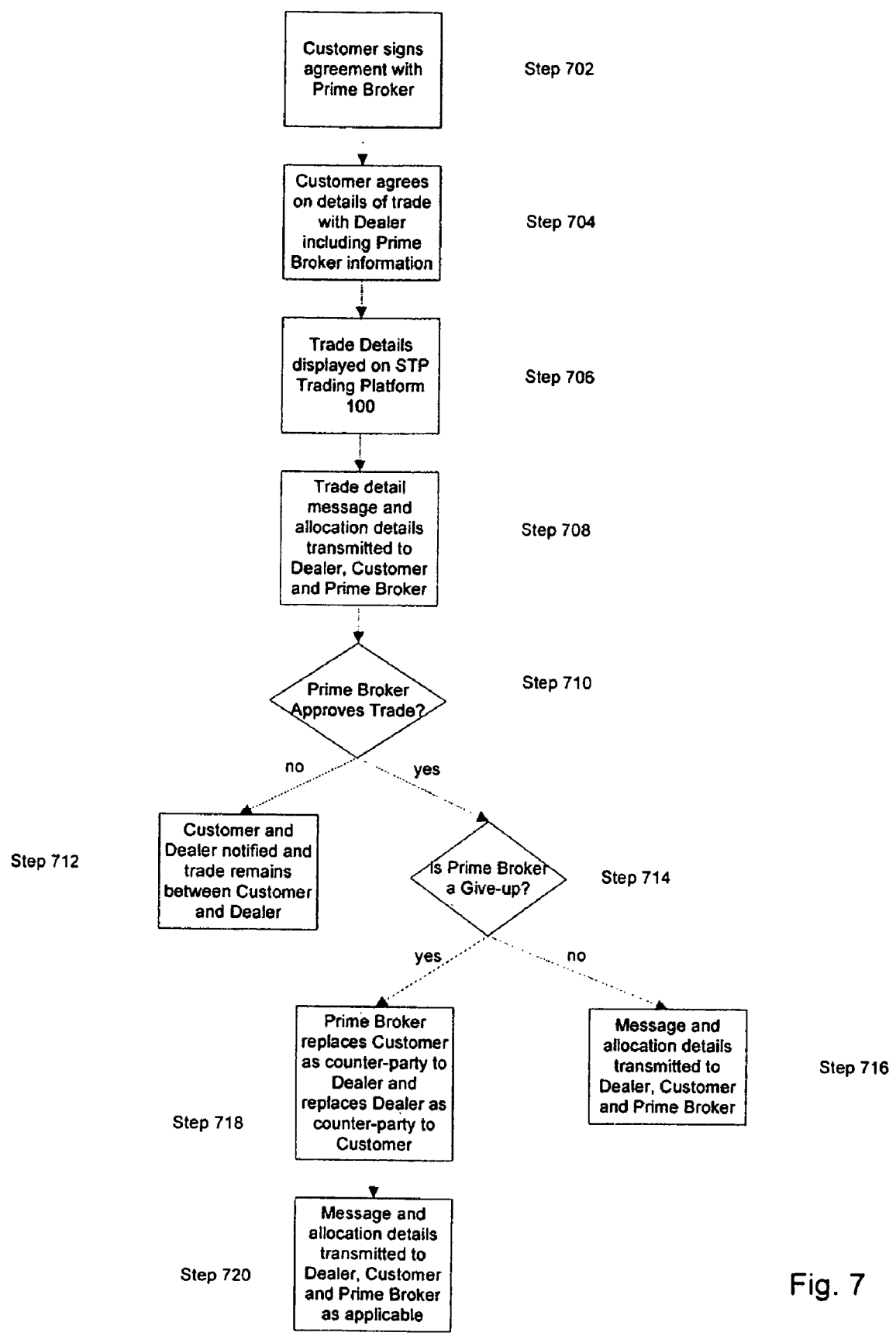
FIG. 7 is a flow diagram depicting an exemplary flow of a prime broker transaction using the STP trading platform.

An embodiment of the additional steps required in the flow of a trade using a prime broker on the STP Trading Platform 100 will now be shown and described in more detail with reference to FIG. 7. First, as discussed above, a customer selects a prime broker to use in the execution of trades. Once the details of the relationship between the prime broker and a customer have been finalized, the prime broker and the customer execute an agreement setting forth the terms or circumstances of when the prime broker may "step into" a trade on customer's behalf and other details regarding the customer's and prime broker's responsibility to each other. Step 702. The electronic trading component 215 operative on customer computer 200 generates graphical interfaces and provides functionality for allowing the customer to identify its prime broker(s) as will be discussed in more detail below. When a customer chooses to execute a trade using its prime broker, the customer and dealer agree to the details of the trade as they would in a non-prime broker transaction using the STP Trading Platform 100 as discussed above, and the customer alerts the dealer that it wishes to use its prime broker to carry out the trade. Step 704. Next, the back-office management component 268 operative on the prime broker computer 265 generates graphical interfaces and provides functionality for allowing the trade details to populate the prime broker's screens and the details are similarly electronically transmitted and displayed to the dealer and customer as discussed below. Step 706 and Step 708.

Once the prime broker has reviewed the details of the trade, the prime broker can either approve or reject the trade based on its relationship with the customer. Step 710. If the prime broker rejects the trade, the customer and dealer receive notification of the prime broker's rejection and the trade remains between the customer and executing dealer. Step 712. If the prime broker accepts the trade, a determination is made as to whether the prime broker is acting in a "give-up" capacity. Step 714. As is known in the art, a prime broker can either provide General Trade Servicing ("GTS"), which means that the prime broker is monitoring the trade of its customers but is not acting in a principal capacity, a prime broker can act in a give-up capacity which means that the prime broker actually becomes a counter party to the trade replacing the customer with an off-setting trade facing the executing dealer. If the prime broker is not acting in a give-up capacity, but rather only providing GTS, a message indicating the successful trade and the allocation details is transmitted to the dealer, customer, and prime broker via the respective back-office management components 220, 277, and 268. Step 716. If the prime broker is acting in a give-up capacity, once the trade details are approved by the prime broker, the prime broker "steps in" in place of the executing dealer as the counterparty for the trade with the customer and "steps in" as the counter-party to the trade with the executing dealer. Step 718. Lastly, a message including the details of the trade which list the prime broker and the dealer as parties of the transaction and allocation details are sent to the dealer, customer and prime broker, as applicable. Step 720.

As was referred to earlier, the STP Trading Platform 100 also can provide functionality that supports the "Remaining Party Model" and the "Step-Out Model" with regard to novation events in the over-the-counter (OTC) markets. The primary difference between the Remaining Party Model and the Step-out Model relates to the entity that is considered the remaining party to the transaction and, therefore, has the right to accept/reject a trade that was assigned to another 3rd party entity (as defined by the ISDA Novation protocol). In the Remaining Party Model, the prime broker remains principle to the original "give-up" transaction. Thus, upon a novation event, they are considered the "Remaining Party" (the customer remains as transferor and the step-in dealer as the transferee) and can accept or reject the assignment. In the Step-Out Model, when the customer assigns the trade to another dealer, an unwind or tear-up occurs between the client and their prime broker for that trade. In this scenario, the prime broker is considered the transferor and the original executing dealer is considered the remaining party. Thus, as opposed to a novation, in an assignment scenario, the original executing dealer has the right to accept or reject the assignment.

In accordance with an embodiment of the present invention, the STP Trading Platform 100 is configured to track the selections made by the parties to a trade to determine whether a novation or assignment has been triggered. Because the STP Trading Platform 100 tracks the customer, prime broker, and dealer on each trade, the STP Trading Platform 100 can make a determination as to whether the prime broker or original dealer is the "remaining party" and, therefore, provide the appropriate interfaces to the remaining party to accept or reject the subject trade.

During the trading process, the STP trading platform 100 permits customers to submit trade inquiries to multiple dealers simultaneously. In this case, for example, the "Order Type" field of the "New Trade Order" message would be set to auction. As discussed above, in the exemplary embodiment, customers can submit requests to purchase from financial instrument inventories, such as commercial paper offering (CPO) and corporate bond inventories. All dealers receiving an inquiry and willing to trade the specific instrument for the transmitted quantity will message the customers with a firm quotation to buy or sell by filling out a trade ticket displayed on the dealer-side computers 260. The customer reviews the quote and determines to accept or reject the quote or allow the quote to lapse. A transaction is completed only if both the customer and dealer accept the quote.

With further reference to FIG. 4, after a transaction is effected over the STP trading platform 100 or imported into the STP trading platform 100, customers acting in some cases for multiple client accounts, may allocate the transaction among those client accounts by transmitting the relevant allocation information to the dealer via the STP trading platform 100. (Step 4*a* discussed above). Also, the pre-trade allocations may be entered in the original trade inquiry. The dealer then can acknowledge the receipt and processing of the allocation information through the STP trading platform 100. (Step 4*b* discussed above). The STP trading platform 100 provides functionality to dynamically enrich trade details with settlement instructions, and generate electronic confirmations, in steps 4*c*-4*e*, as discussed further below. The electronic confirmations are then made available to customers for review and acceptance, in step 4*f*, and, in step 4*g*, the customer can electronically confirm or reject the trade through the STP trading platform 100. In step 4*h*, if the electronic confirmation is confirmed by the customer and dealer, then the trade is listed as "AFFM" in the master blotter stored in the trade history database 115 of the STP trading platform 100. This process will be described in greater detail below.

Figure 8:
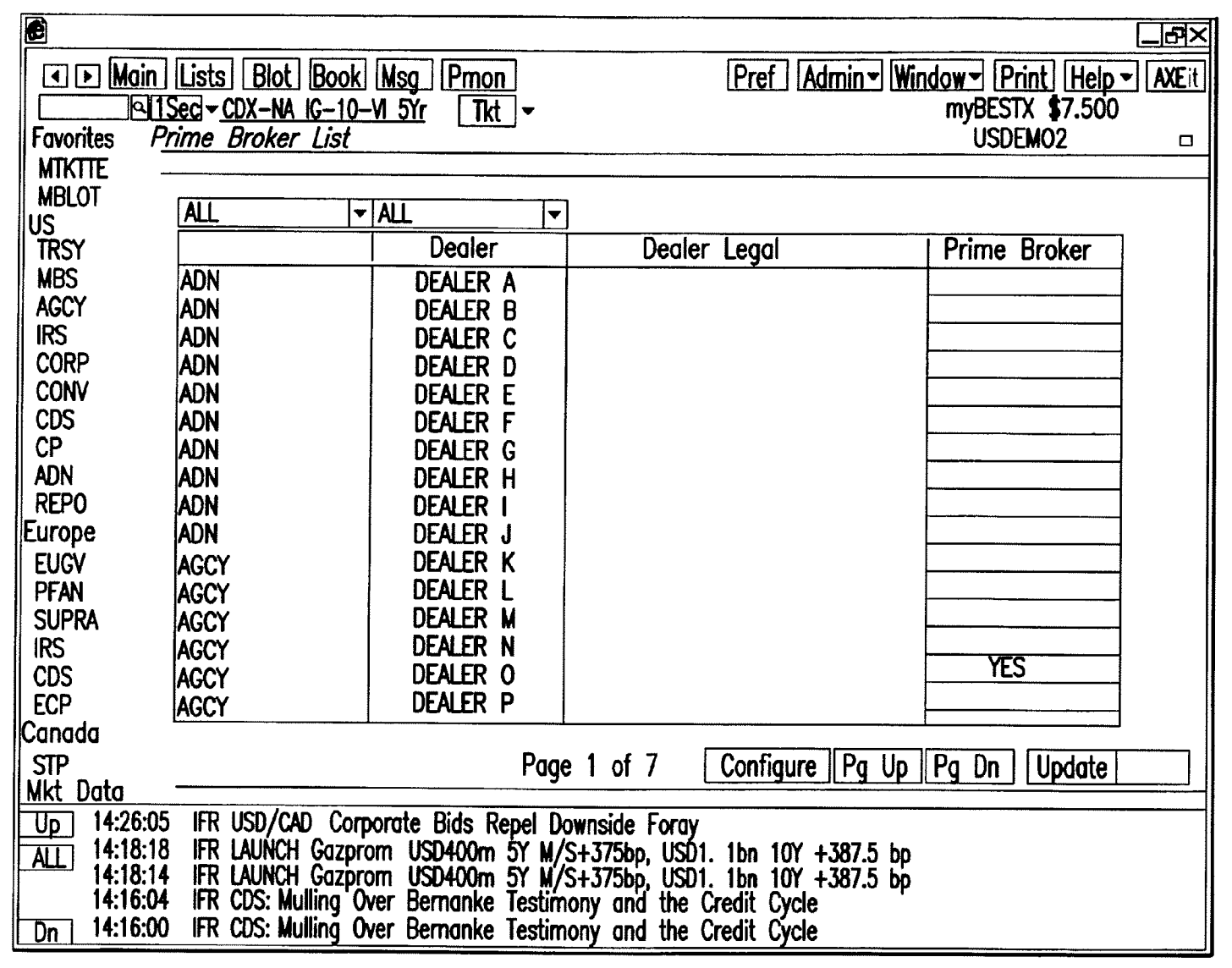
Figure 10:
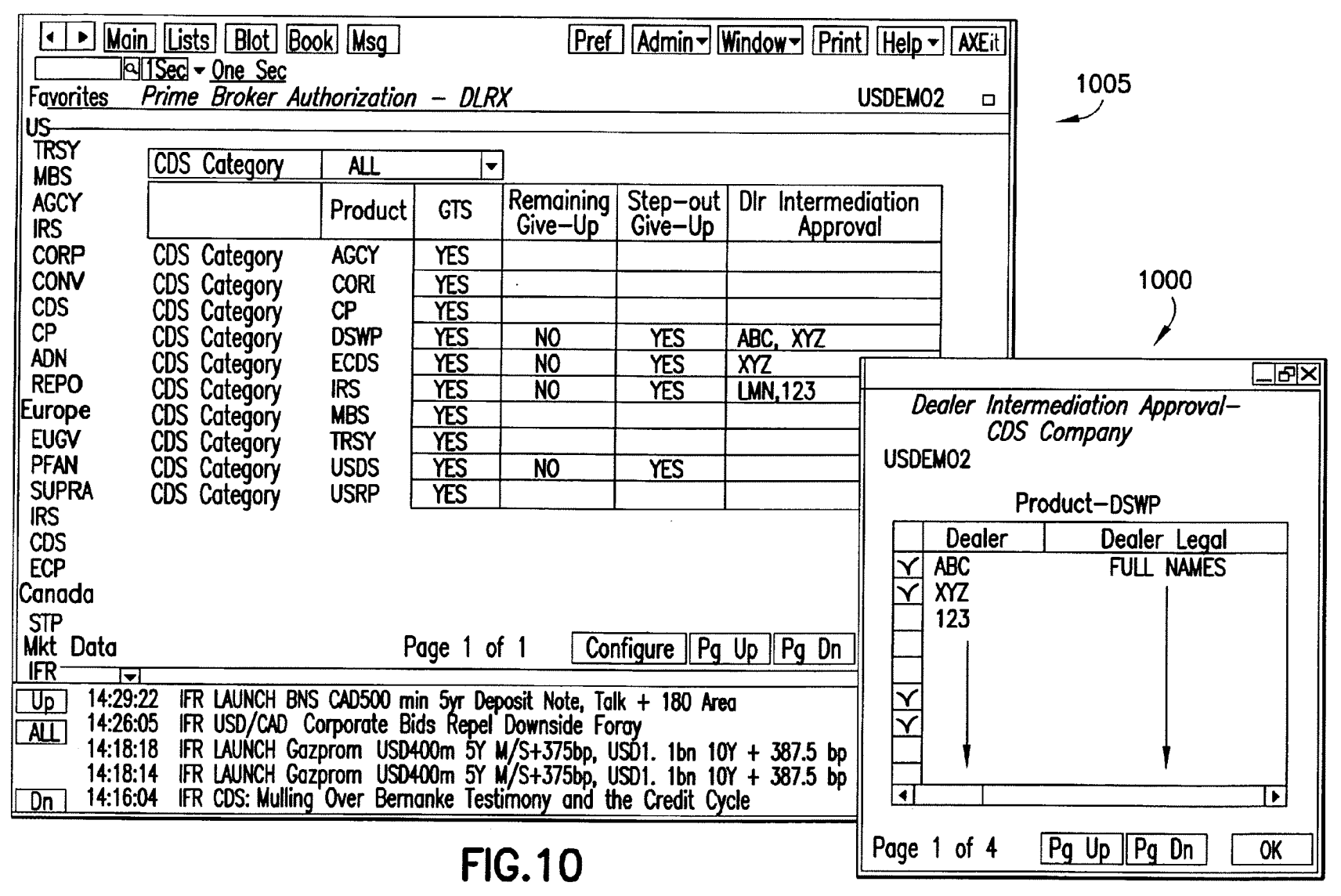

With reference now to FIGS. 8-17, there are shown screen shots of an exemplary user interface using a prime broker in the STP trading platform 100. As can be seen in FIG. 8, for each customer 200 that has a prime broker or wants to include a prime broker in an executed trade, a customer can retrieve a list of its prime brokers to specifically select which prime broker it wishes to use for a particular trade. Since customers may have multiple prime brokers, this enables the customer to choose which prime broker to use for which trade. Additionally, the prime broker can use a view, as shown in FIG. 9, to view a listing of users who have chosen them as prime brokers and to authorize which prime broker services should be allowed for each particular customer. For example, as can be seen in FIG. 10, a prime broker can choose or select which of its customers should have which prime broker service per product. For example, as discussed above, a prime broker can give its customer GTS which means that the prime broker will monitor and perform operational processing requirements for the customer's trades but will not become a principle on the trade itself. Although the prime broker will not act as a principle, it may act as a clearing agent. Alternatively the prime broker can provide a "give up" service to its customers in which the prime broker would become the principle on the transaction in lieu of its customer. Thus, the prime broker has the ability to designate which of its customers maintain which services from within the STP Trading Platform 100.

Utilizing the prime broker software client 266, the prime broker computer 265 is configured to receive and display a page displaying a list of dealers along with a list of customers. Utilizing this listing, the prime broker will be allowed to establish links to their customer base and identify which customers should have which prime broker services for which product. Once the prime broker has identified its customers in the account management database 110 using for example display 1000 and 1005, the customer will have the opportunity to view and confirm the prime broker's inputted information.

The linking information identified in the account management database as described above enables the STP Trading Platform 100 to monitor transactions involving the prime broker and its customers and enables the display via a Viewer interface of such transaction information. The linking of the transaction information in this manner enables the "give-up" authorization process and trade processing flow described herein.

Figure 11:
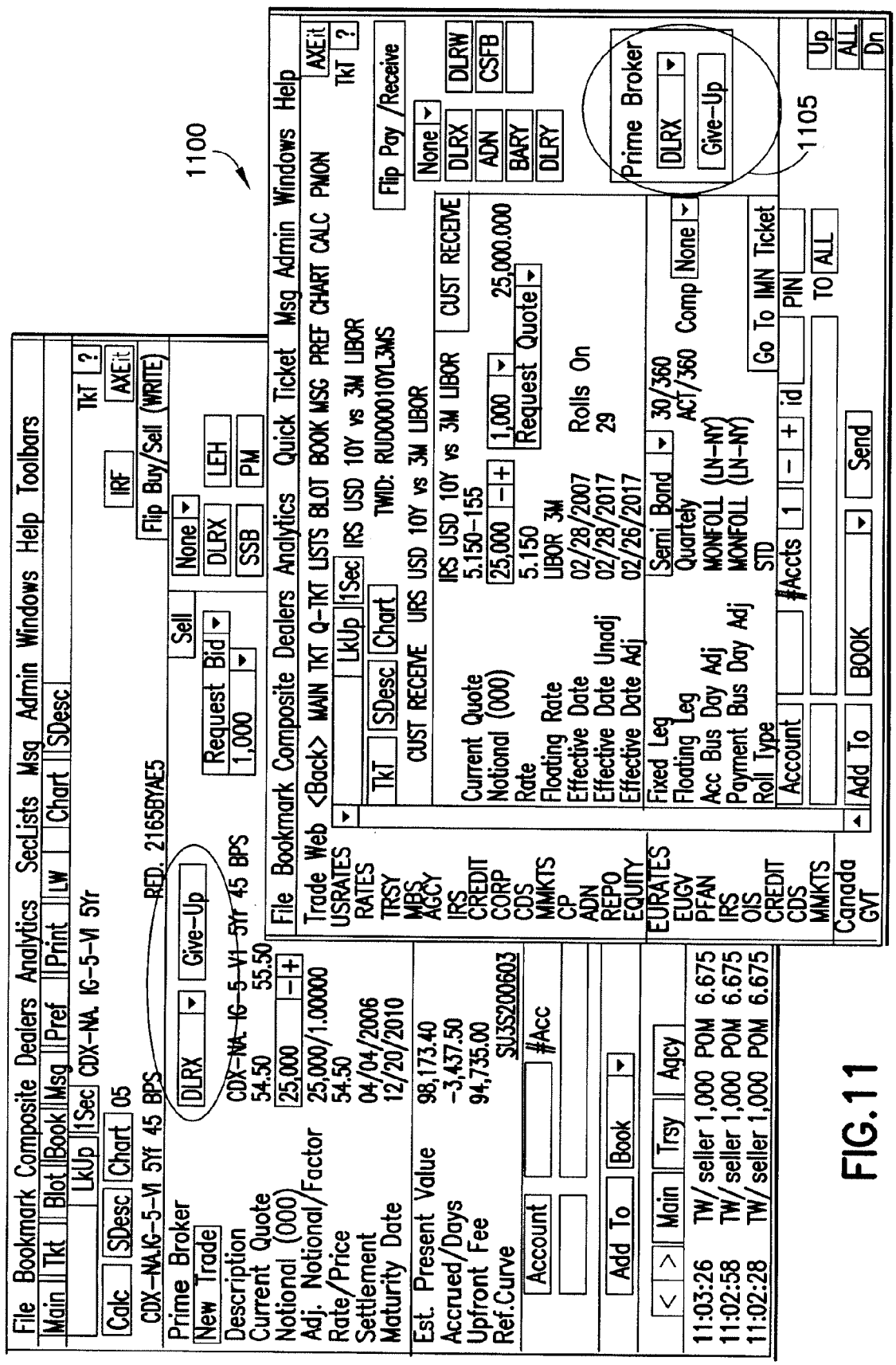

Screenshot interfaces depicting the execution of a trade utilizing a prime broker on the STP Trading Platform 100 will now be described in greater detail. As can be seen in FIG. 11, the trading screen 1100 preferably has a drop down list allowing the user to click on or select the prime broker to be used in connection with the execution of a trade from drop down list 1105. Alternatively, the customer can select to not use a prime broker for the execution of the trade and rather process the trade directly. If the customer elects to use a prime broker in a give-up capacity, only dealers that have been identified as approved for intermediation by the prime broker are available to be selected by the customer for the trade inquiry. Once a trade is executed, as can be seen in FIG. 12, a view 1200 summarizing details of the trade is displayed for the customer. As can be seen in Pane 1205, when a give up service is selected, the prime broker (e.g., DLRX) and the trade type is listed as a new trade and as a give up. At that point in time, a message is sent to the prime broker on the system and the prime broker has the ability to approve or to reject the trade. As is known in the art, if the prime broker does not accept or reject the trade within a certain time period, the prime broker's lack of action is viewed as an acceptance. In certain embodiments, the STP Trading Platform 100 can wait to receive an affirmative acceptance or rejection from the prime broker before designating the trade as having been accepted. After the trade is accepted by the prime broker the trade-type can change to indicate such acceptance.

Figure 13:
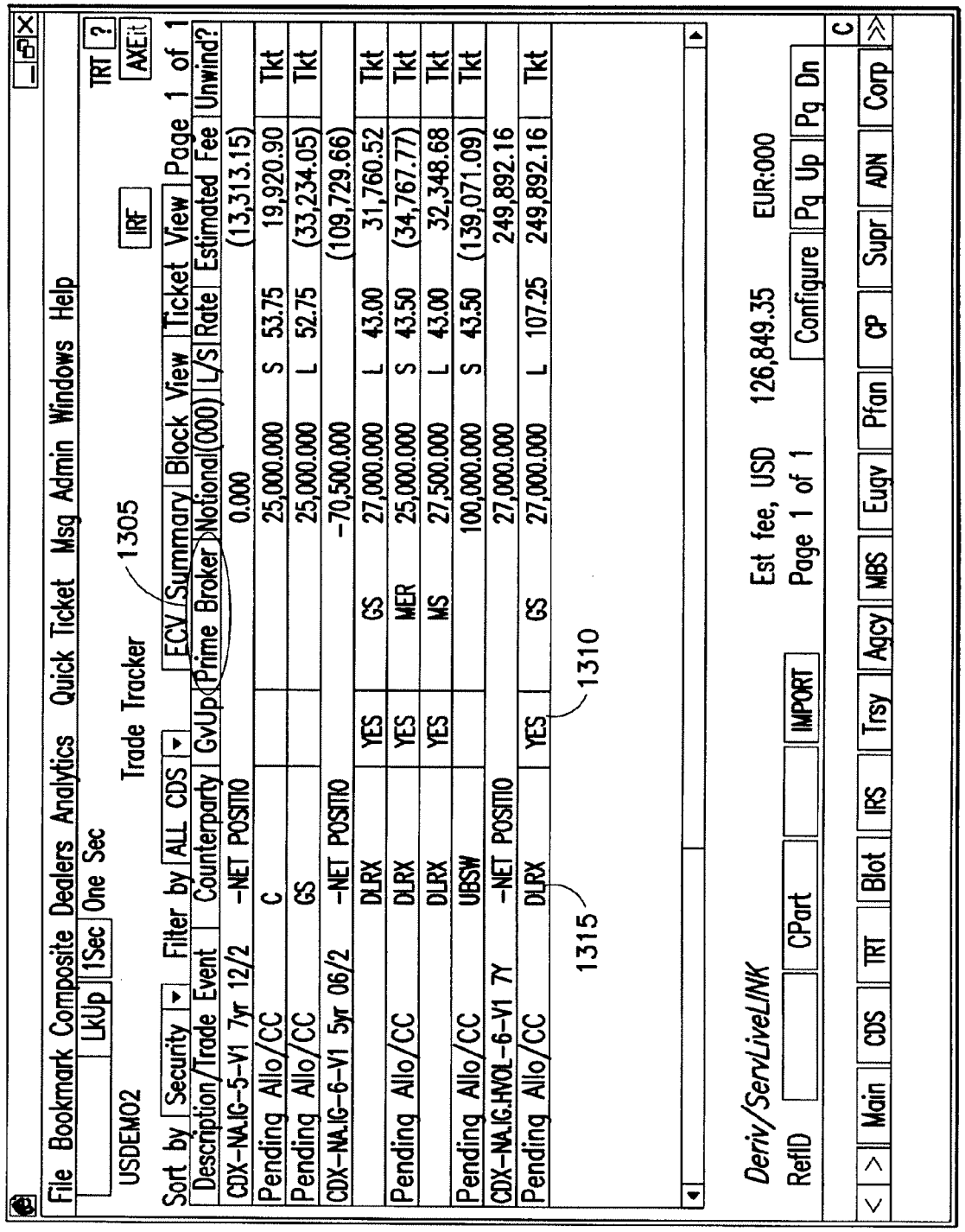

As can be seen in FIG. 13, a screen showing the status of various trades including a prime broker field 1305 is shown. The summary lists the details of the trade including the counterparty, the rate and any estimated fee associated with such trade. Additionally, the give-up state field 1310 indicates whether the trade was executed using a prime broker who became the principle of the trade. If the give-up service was used, the prime broker is listed in counterparty field 1315 and the executing dealer is listed in the prime broker field 1305. If however, the prime broker was used as a GTS, such prime broker is listed in the prime broker field 1305 and the executing dealer is listed in the counterparty field 1315.

Figure 14:
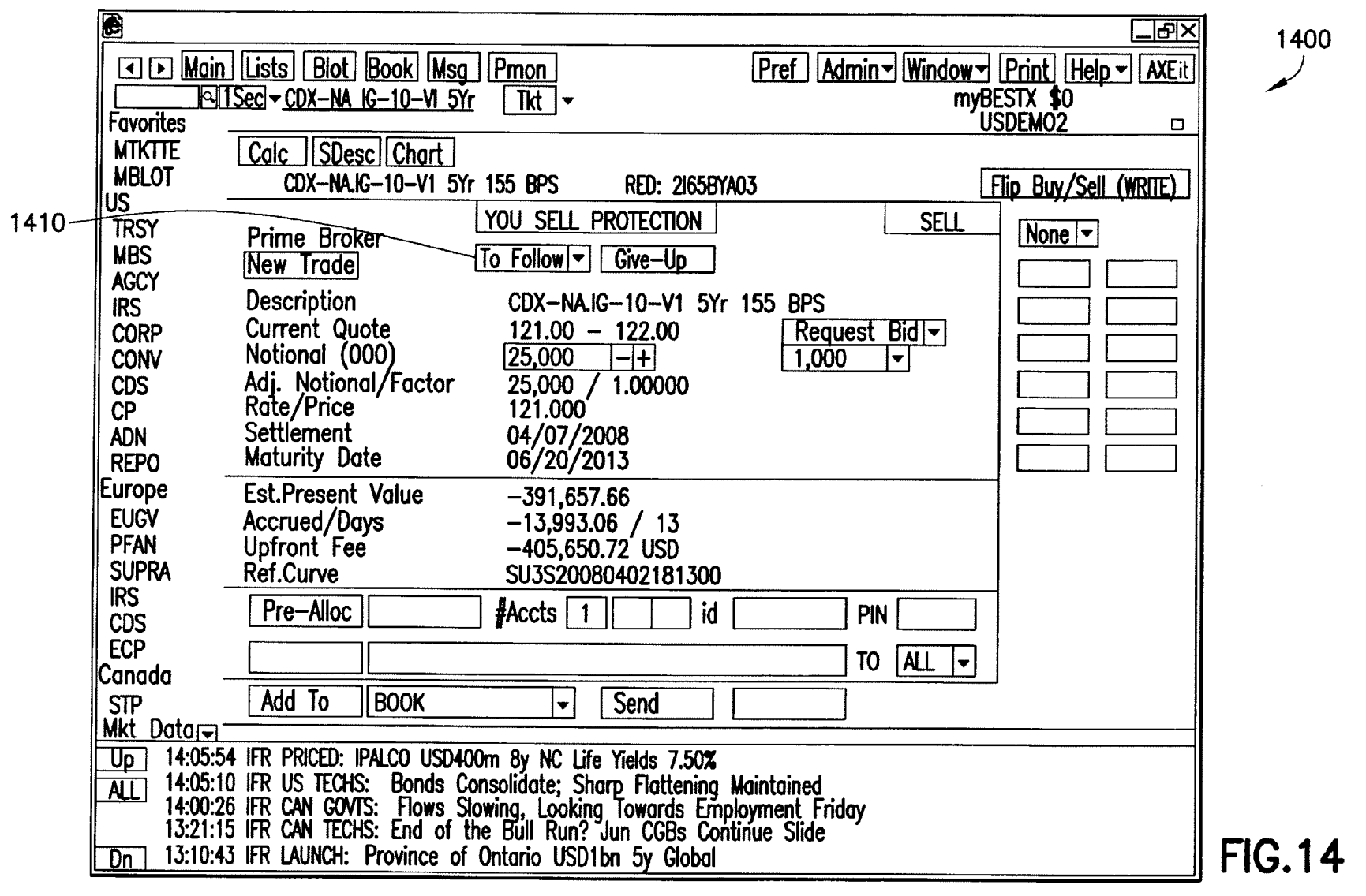

In an alternate embodiment, a customer can indicate that a prime broker is to be used for a particular transaction but not designate which prime broker is to be used until a later point in the transaction. A screenshot depicting such a scenario is shown in FIG. 14. As seen in FIG. 14, a screen 1400 which displays a trade inquiry by the customer where the prime broker field 1410 is set to "to follow". This indicates that the customer has requested a give-up but does not yet want to reveal their prime broker.

Once the trade has been executed, as can be seen in FIG. 15, a detail page 1500 will be displayed for the customer and the dealer and the prime broker field 1510 will show "PB to Follow/Give Up". Once again indicating that a give-up has been requested by the customer but no prime broker has been chosen.

Additionally, as can be seen in FIG. 16, a customer can identify their prime broker from display 1600 at the sub-account level. This is necessary, because if using a prime broker, the customer enables a sub-account with such prime broker so the prime broker will have access to view and accept trade information. As can be seen in field 1610, the customer can either enter a name of their prime broker of choose a prime broker from their drop down list based upon the information stored in the account management database 110. Once the prime broker has been identified at the prime broker level, the prime broker will be informed about the trade and access information related thereto via the prime broker computer 265 utilizing the prime broker software client.

Figure 17:
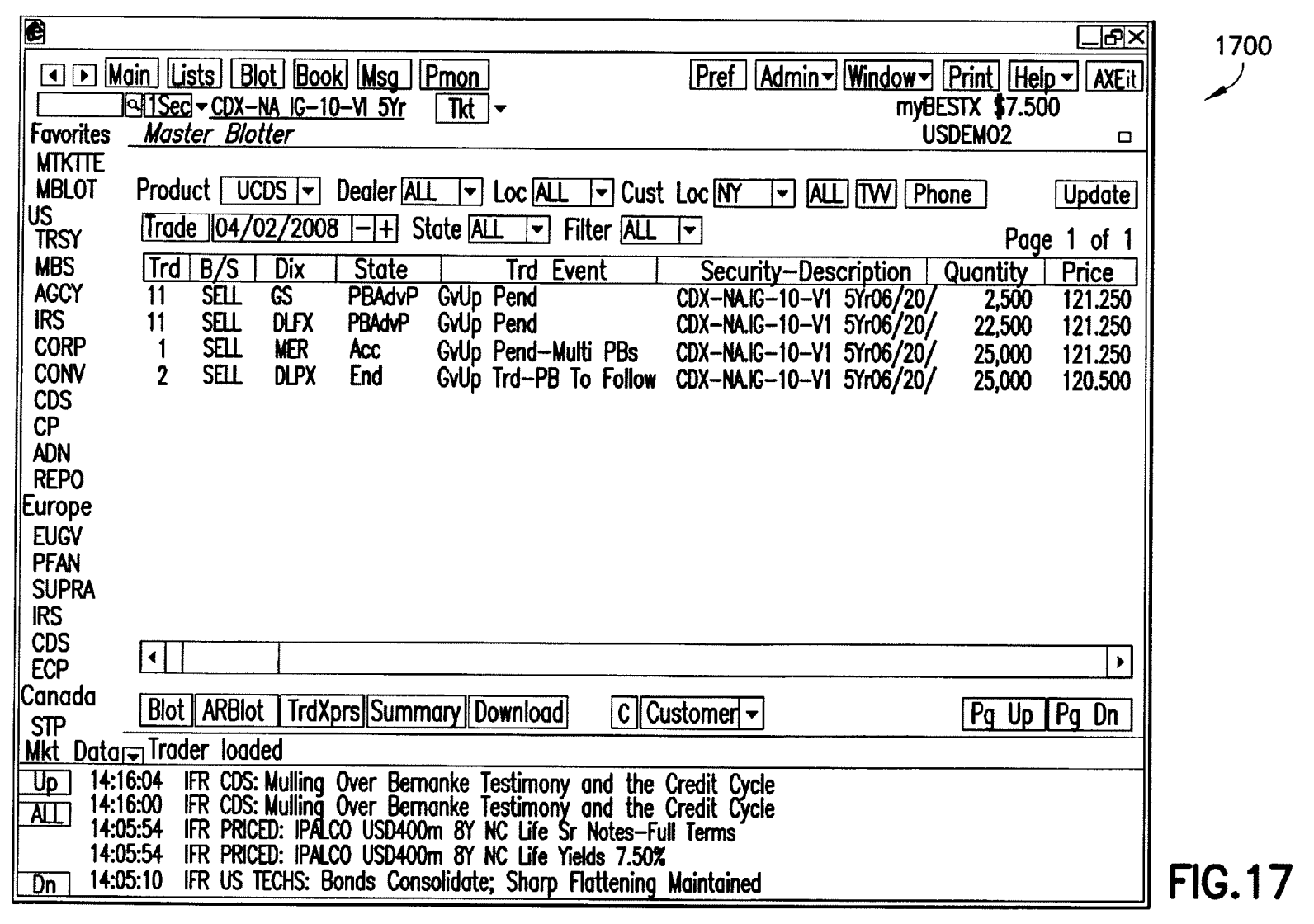

As can be seen in FIG. 17, screen 1700 is displayed for the prime broker to show details about the trade and obtain consent for the give-up. Additionally, messaging can be sent to the client via a message API as discussed above to alert the prime broker that consent to a give-up is being requested.

The customer may have the authorization, as part of a transaction, to trade using the credit of a dealer. In one embodiment, when a prime broker is selected and the customer selects "Give-up", the STP Trading Platform will perform a check against the account management database 110 to determine the Executing Broker Agreements on file. Based on the dealers the prime broker has an agreement with, the STP Trading Platform will only allow an inquiry to be submitted to the corresponding dealers.

3. Trade Execution—Alternate Systems and Phone Trades

The STP trading platform 100 is also preferably configured to process trades executed on systems other than the electronic trading module of the STP trading platform 100, such as trades executed via telephone or by an alternate electronic trading system. In these cases, trade details from alternate systems can be electronically imported into the STP trading platform 100 via electronic messaging using an API. Once the trade data is imported into the trade history database of the STP trading platform 100, STP functionality, as described herein, can be provided for trades executed on alternate systems or via the telephone. In the exemplary embodiment, the STP trading platform 100 are be communicatively linked to a dealer's internal systems or trade management systems to import trade details. The trade details are delivered to the customer via STP trading platform 100 in the "DONE" state. If the trade details are accepted or "checked-out" by the customer, the state will change to "ACC", and thereafter trade details are then treated similarly as trades completed via the electronic trading module of the STP trading platform 100. Such trades may then be allocated and electronically confirmed via the STP trading platform 100, as described further below.

Figure 18:
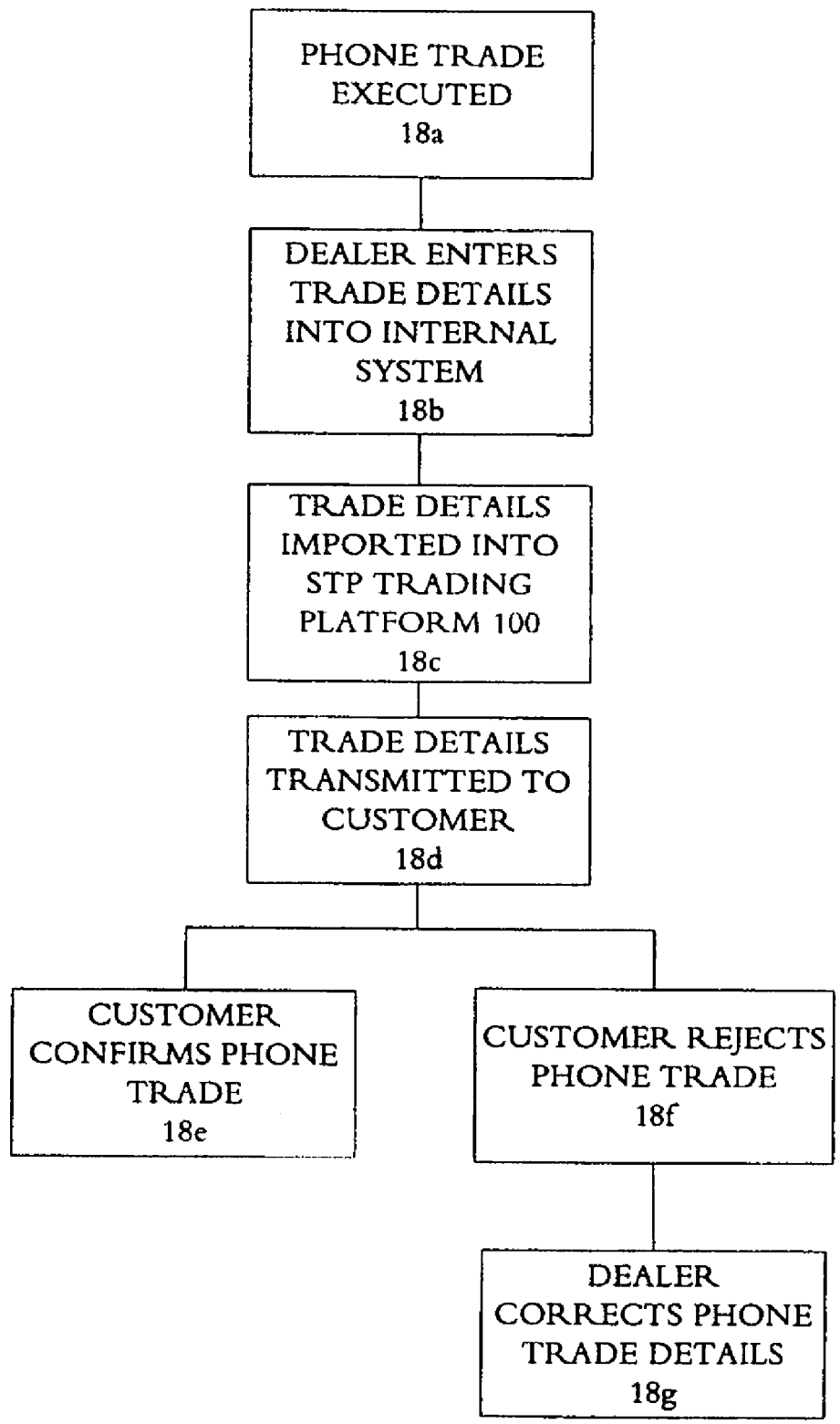
FIG. 18 is an exemplary data flow for handling phone trades via the STP trading platform.

With reference now to FIG. 18, the flow of a phone trade will now be shown and described. In a first step 18*a*, the dealer and customer execute a phone trade in a known manner. The dealer then inputs the trade details into its internal trade management system, in step 18*b*. In step 18*c*, the phone trade details are electronically imported into the STP trading platform 100 using the exemplary message format shown above. Phone trades are differentiated from other trades by virtue of an identifier; for example, "SRC=PH." At this point, the phone trade details are assigned a "DONE" state (see Table V below) while customer acceptance is outstanding. In step 18*d*, the phone trade details are messaged to the customer-side electronic trading module 215 for review by the customer. The customer may accept the phone trade, as in step 18*e*, or reject the phone trade, as in step 18*f*. If the phone trade is accepted or checked-out, it is assigned the "ACC" state. If the phone trade is rejected, it is assigned the "REJ" state. In the case of a rejected trade, the dealer is given an opportunity to correct the phone trade details, in step 18*g*. The process flow returns to step 18*d* and the corrected phone trade is transmitted again to the customer. The corrected phone trade is again assigned the "DONE" state. Additionally, a phone trade popup message which can include the phone trade details that can be displayed for the customer to allow the customer to review the details of the phone trade and permit the customer to confirm or reject such trade.

Phone trades that are accepted by the customer may be allocated, confirmed, assigned to a prime broker and enriched with settlement instructions in the same manner as other trades handled by the STP trading platform 100.

5. Trade Acceptance, Allocation, and Confirmation

At each stage of a trade effected on the STP trading platform 100, or via alternate methods (e.g., phone trades) the trade is assigned a state that can be monitored by customers and dealers and prime brokers. An exemplary set of state codes is shown in Table V below.

TABLE V

EXEMPLARY STATE CODES

| State Codes | Explanation |
| --- | --- |
| DONE | Imported block trade details form phone trade or alternate trading system. |
| ACC | Block trade is accepted by customer, but not allocated. |
| REJ | Block trade not accepted by customer. |
| END | Inquiry made, but no trade executed. |
| ALLOC | Block trade allocated to sub-accounts, but not confirmed by dealer. |
| CONF | Dealer confirms all allocations, but does not send ETC. |
| DLRCONF | Dealer confirms all allocations and sends ETC to customer. |
| CONFP | Dealer confirms some, but not all of the allocations. No ETC transmitted. |
| AFFM | Customer affirms trade details in ETC. |
| ETCREJ | Customer rejects ETC or chooses to amend allocations. |
| ERR | Dealer cannot confirm trade details. |
| PBADV | Prime Broker advice regarding give-up or GTS trade. |

Electronic Confirmation/Clearance

Figure 19:
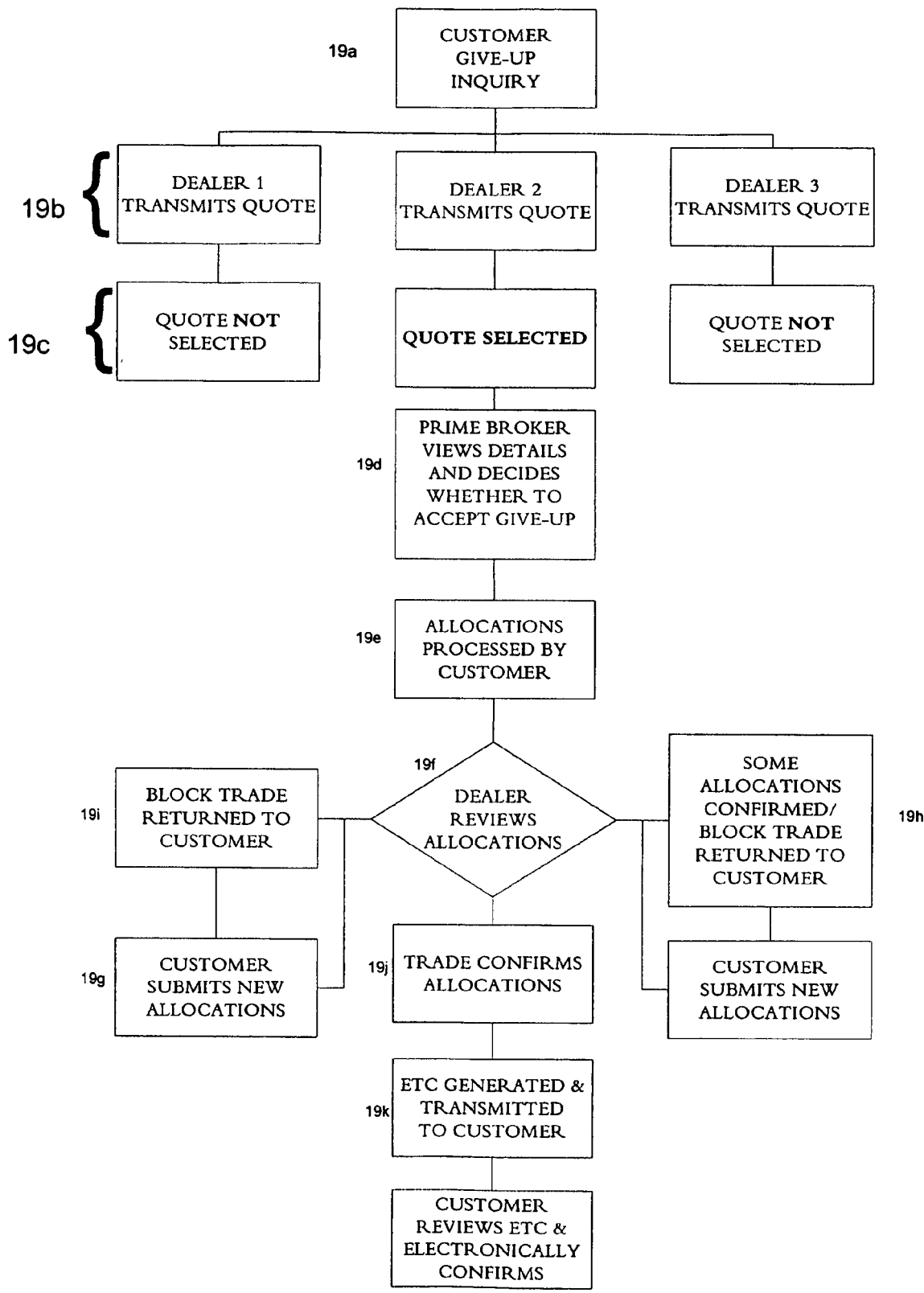
FIG. 19 is an exemplary data flow for allocating and confirming a block trade using an Electronic Trade Confirmation.
Figure 20:
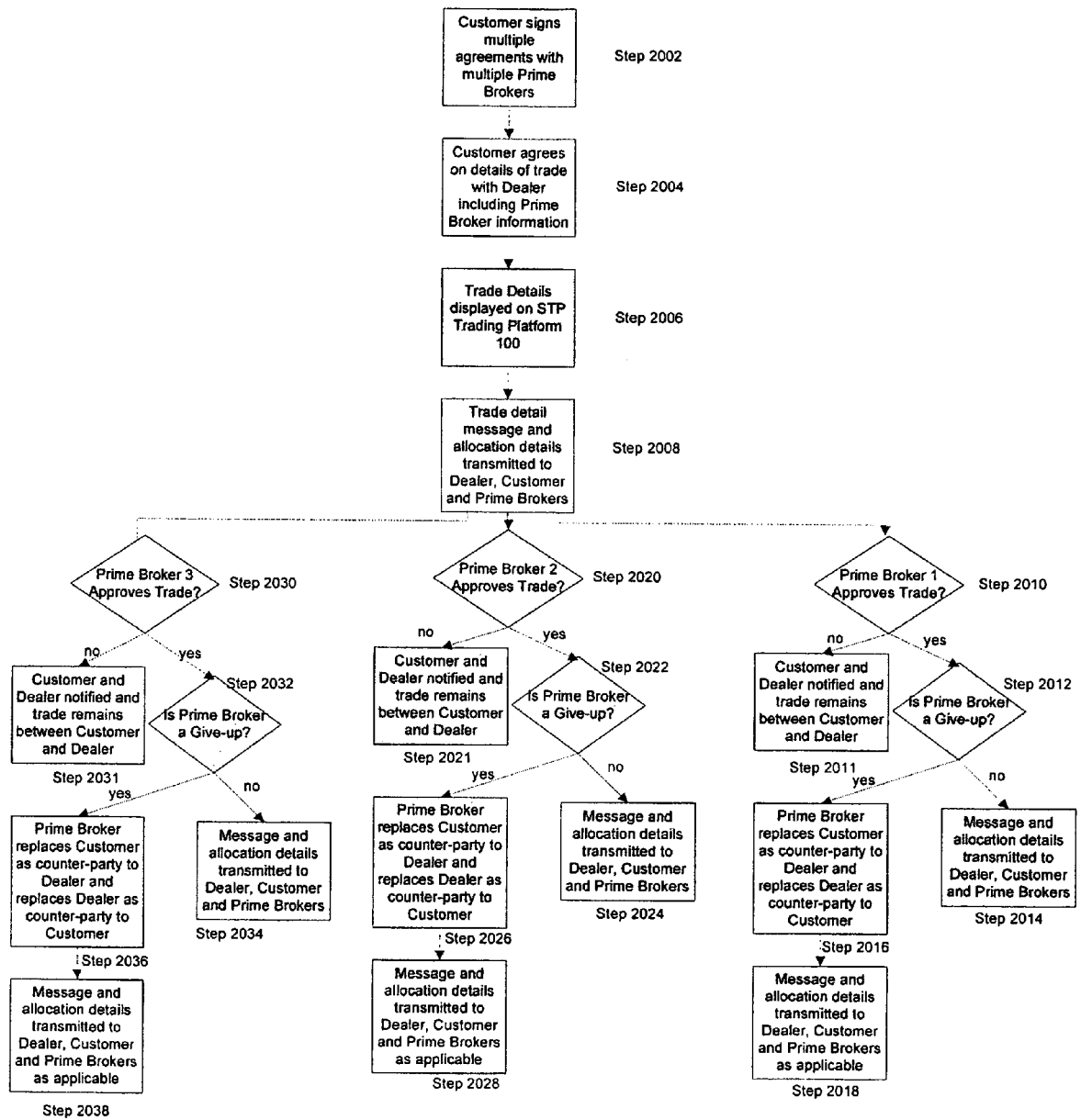
FIG. 20 is a flow diagram depicting an exemplary flow of a multiple prime broker transaction using the STP trading platform.

Furthermore, according to the exemplary data flow of FIG. 19, the STP trading platform 100 is preferably, but not necessarily, configured to compare trade details and related information received from dealers and customers and permit electronic confirmation according to applicable government laws, rules and regulations. By example, SEC Rule 10b-10 requires that certain disclosures be included in a confirmation. In order to satisfy SEC Rule 10b-10, the STP trading platform 100 may be programmed to generate an electronic trade confirmation ("ETC") template containing the required Rule 10b-10 disclosures. To satisfy SEC Rule 10b-10, in the exemplary embodiment, the ETC template preferably includes the fields listed in Table VI. Table VI also sets forth an exemplary model for retrieving information from the account management and trade history databases 110, 115 to facilitate creation of the ETC.

TABLE VI

EXEMPLARY ETC FIELDS

| Fields | Dealer Supplied | STP Trading Platform Supplied |
| --- | --- | --- |
| Trade time | | TH |
| Trade date | | TH |
| Price | | TH |
| Nominal/Quantity | | TH |
| Principle/Gross amount | X | |
| Accrued | X | |
| Net | X | |
| Acted as: Principle/Agent/Agency Cross | X | |
| Dealer legal entity | X | |
| Buy/Sell | | TH |
| Settlement date | | TH |
| Number of days accrued | | TH |
| Settlement currency | | TH |
| Security code | | TH |
| Security code type (e.g., CUSIP, ISIN, SEDOL) | | TH |
| Security description | | TH |
| Client name | | TH |
| Confirmation reference number | | TH |

TABLE VI-continued

EXEMPLARY ETC FIELDS

| Fields | Dealer Supplied | STP Trading Platform Supplied |
|---|---|---|
| Trading conditions | X | |
| Dealer disclaimer | | AM |
| Dealer address | | AM |
| Customer address | | AM |
| Dealer telephone number | | AM |
| Callable debt disclaimer (may be part of Dealer disclaimer above) | | AM |
| Asset backed disclaimer (may be part of Dealer disclaimer above) | | AM |
| Comment field | X | |
| Alternative security code | | AM |
| Exchange rate | X | |
| Standing Settlement Instructions (SSI) from account management system. | | AM |

TH = Retrieved from trade history database 115
AM = Retrieved from account management database 110

The exemplary confirmation system of the present invention where a prime broker is used preferably follows the following data flow as shown in FIG. 19. In step 19a, a customer makes a give-up trade inquiry identifying that the customer wishes to use a prime broker for the proposed transaction. One or more dealers transmit trade quotes, in step 19b. The customer then, in step 19c, selects one of the quotes to execute a trade. For trades effected on the STP trading platform 100, the trade details for block trades including information about the prime broker would be stored electronically in an associated trade history database 115. As described above, the trade history database 115 stores a record for each trade executed on the STP trading platform 100 using a unique identifier for each such trade. For non-system trades, such as trades effected over alternate electronic systems and telephone trades, the trade details for block trades would be electronically imported by a dealer through the dealer's trade blotter interface and then communicated to the appropriate customer and prime broker, as described above. If the terms of the non-system block trade are accepted by the customer, the block trade is given the "ACC" state and a record of the accepted trade is stored in the trade history database 115. The block trade detail can then also be used to populate the trade blotter and other back office management interfaces of the customer and the prime broker.

After receiving the trade details of an accepted block trade, a prime broker would decide whether to accept the trade as a prime broker as described above. Step 19d. Once the prime broker accepts the give-up, the customer reviews the details and may include any trade allocation instructions in step 19e. The STP trading platform 100 assigns the "ALLOC" state and transmits each allocation ticket created by the STP trading platform 100 as a result of the customer's allocations to the dealer and prime broker. A record of the allocations is also stored by the trade history database 115. At this point, each allocation ticket may be enriched with settlement instructions electronically accessed from the account management database 110 of the STP trading platform 100.

Next, in step 19f, the dealer reviews the allocation tickets and processes the trade details for each sub-account set forth in the allocation. The dealer may then acknowledge that it has processed and accepted each allocation ticket in step 19g. In the event that an allocation is not processed by the dealer (e.g., a sub-account has not been mapped to the dealer's internal system), as in step 19h, the dealer can only confirm certain of the allocations and the trade will be assigned the "CONFP" partial confirmation state and an error message will be transmitted over the STP trading platform 100 to the customer with specific instructions explaining why the specific allocation ticket could not be processed. If the dealer rejects all of the allocations, as in step 19i, the trade will be returned to the customer and assigned the "ERR" state.

After all of the allocation tickets are processed and confirmed by the dealer, the STP trading platform 100 may generate an ETC, in step 19j. At this point, the allocated trade is assigned the "CONF" state. Each ETC will preferably include all the information required to be disclosed under relevant government laws, rules, or regulations, if applicable, such as by way of example SEC Rule 10b-10. In addition, the ETCs would provide dealers the ability to include any additional disclosures that they may wish to provide, which are specific to the dealer. The ETC may also indicate that the customer should contact the dealer with whom it effected a transaction with any questions. Any such communication following delivery of the ETC would preferably occur directly between the dealer and the customer, although the dealer and the customer may elect to use electronic messaging facilities provided by the STP trading platform 100. Persons of skill in the relevant art will recognize that although it is preferred that the ETC conform to applicable government laws, rules, or regulations, the ETC of the present invention may be utilized in jurisdictions where not such applicable government laws, rules, or regulations exist. In such cases, the ETC may still be used to electronically confirm trades in a binding fashion through use of master trading agreements and the like.

In operation, the ETC is populated by the STP trading platform 100 using the enriched trade details and allocations stored in the trade history database 115 and the settlement instructions retrieved from the account management database 110 to preferably provide a standardized electronic confirmation as required by government regulation. (e.g., SEC Rule 10b-10). Persons of skill will recognize that additional dealer disclosures can be automatically inserted or manually input into the standardized ETC form. Once the ETC is generated on the dealer-side, through transmission of the ETC through the STP trading platform 100, the customer and prime broker receives and can review and electronically confirm the trade details through the STP trading platform 100 by indicating an acceptance of the ETC. Upon confirmation by a customer, in step 19k, the STP trading platform 100 would display the transaction state as "AFFM".

Each of the customer, dealer and prime broker would have the ability to view, download, and/or print their ETCs through the STP trading platform 100, and may establish default procedures pursuant to which such ETCs are downloaded and/or printed automatically. ETCs would also preferably be stored electronically by the STP trading platform 100 in the trade history database 115, although this feature is not required.

The STP trading platform 100 may also enable the customer (or a custodian or designated third party on behalf of the customer) to accept the trade details and settlement instructions in a number of different ways. First, the customer may use the back office management tools provided by the STP trading platform 100 to receive the trade details and the related settlement instructions from the dealer and manually compare the information it receives against its internal records. If the customer agrees that the information it received from the dealer matches with the information in its database, the customer will transmit an indication that the customer affirms the trade details and the settlement instructions via the STP trading platform 100 to the dealer.

Alternatively, the STP trading platform 100 may provide functionality to enable customers to electronically affirm trade details and settlement instructions in order to electronically match trade data submitted by dealers and customers. In such instances, the electronic confirmation would be based on the matched trade data and other information provided. In one exemplary embodiment, the STP trading platform 100 records the trade details on behalf of the customer as trades are effected via the electronic trading module 160 of the STP trading platform 100, as described above. In a second exemplary embodiment, trade information is made available to the STP trading platform 100 through an API that interacts with the customer's internal trade processing systems and/or order management systems, as also described above.

The trade details and settlement instructions provided by the customer are then electronically matched by the STP trading platform 100 to trade details and settlement instructions provided by the dealer on the STP trading platform 100. If the trade details and settlement instructions received from the dealer match the information provided or made available to the STP trading platform 100 by the customer, the STP trading platform 100 will electronically and automatically affirm the trade on behalf of the customer.

The STP trading platform 100 may also transmit the affirmed trade confirmation (in accordance with the applicable self-regulatory organization rules) directly to a depository, such as the Depository Trust & Clearing Corporation ("DTCC") or a settlement agent for settlement of the trade.

Settlement Instruction Validation

With reference to FIG. 2, in the exemplary embodiment, on a periodic basis, a settlement instruction validation system 180 compares the data in the account profiles stored on the account management system 110 to known data sources. By making such a comparison, the settlement instruction validation system 180 can determine whether there are any errors present in the stored settlement instructions.

By way of non-limiting example, on one level, the settlement instruction validation system 180 compares settlement instructions to databases such as the SWIFT BIC, the Euroclear code, and other like directories comprising codes for various entities and securities involved in the settlement process. Furthermore, the settlement instruction validation system 180 may perform character-based validation. In this example, the settlement instruction validation system 180 compares known standards for certain fields with the actual stored fields. For example, it is known that Bank Routing Number (or ABA number) must have 8-digits. The settlement instruction validation system 180 would detect an ABA number field with less than 8-digits. Errors can be reported in a summary validation report that may be issued daily, weekly, monthly, or on some other time basis as a matter of design choice. The reports would identify errors in stored settlement instructions and permit correction to avoid settlement failures.

In one embodiment as is described in published U.S. Patent Application No. 2005/0234807 entitled "Method and System for Effecting Straight-through-Processing of Trades of Various Financial Instruments" the entire contents of which is hereby incorporated herein by reference, the STP trading platform 100 is programmed to generate performance reports for customers and dealers to enable enriched tracking of trade executed and STP performance. Those reports can also be extended to include reports that incorporate prime brokerage functionality and STP performance.

In one embodiment of the present invention, a customer can utilize multiple prime brokers for a single trade and either use such prime brokers in tandem with each other or use the prime brokers as alternatives to each other. An embodiment showing the additional steps required in the flow of a trade using multiple prime brokers on the STP Trading Platform 100 will now be shown and described in more detail with reference to FIG. 20. First, as discussed above, a customer selects prime brokers to use in the execution of trades. For each prime broker, an agreement is executed that outlines and governs the relationship between such prime broker and the customer and sets forth when such prime broker will "step into" a trade on customer's behalf. Step 2002. The electronic trading component 215 operative on customer computer 200 generates graphical interfaces and provides functionality for allowing the customer to identify its prime brokers as discussed above. When a customer chooses to execute a trade using multiple brokers, the customer and dealer agree to the details of the trade as they would in a non-prime broker or single prime broker transaction using the STP Trading Platform 100 as discussed above, and the customer alerts the dealer that it wishes to use its prime broker to carry out the trade. Step 2004. Next, the back-office management component 268 operative on the prime brokers computers 265 generates graphical interfaces and provides functionality for allowing the trade details to populate the prime brokers' screens and the details are similarly electronically transmitted and displayed to the dealer and customer as discussed above. Step 2006 and Step 2008.

Once the prime broker have reviewed the details of the trade, each prime broker can either approve or reject the trade based on its relationship with the customer. Step 2010. If for example the first prime broker rejects the trade, the customer and dealer receive notification of the prime broker's rejection. 2011 If the first prime broker accepts the trade, a determination is made as to whether the first prime broker is acting in a "give-up" capacity. Step 2012. If the first prime broker is not acting in a give-up capacity, but rather only providing GTS, a message indicating the successful trade and the allocation details is transmitted to the dealer, customer, and prime broker via the respective back-office management components 220, 277, and 268. Step 2014. If the prime broker is acting in a give-up capacity, once the trade details are approved by the prime broker, the prime broker replaces the executing dealer as the counterparty for the trade with the customer and steps in as the counterparty to the trade with the executing dealer. Step 2016. A message including the details of the trade which list the prime broker and the dealer as parties of the transaction and allocation details are sent to the dealer, customer and prime broker(s), as applicable. Step 2018.

If the first prime broker has rejected its participation in the trade, and the second prime broker has reviewed the details of the trade, the second prime broker can either approve or reject the trade based on its relationship with the customer. Step 2020. If for example the second prime broker rejects the trade, the customer and dealer receive notification of the prime broker's rejection. Step 2021 If the second prime broker accepts the trade, a determination is made as to whether the second prime broker is acting in a "give-up" capacity. Step 2022. If the second prime broker is not acting in a give-up capacity, but rather only providing GTS, a message indicating the successful trade and the allocation details is transmitted to the dealer, customer, and prime broker via the respective back-office management components 220, 277, and 268. Step 2024. If the prime broker is acting in a give-up capacity, once the trade details are approved by the prime broker, the prime broker replaces the executing dealer as the counterparty for the trade with the customer and steps in as the counterparty to the trade with the executing dealer. Step 2026. A message including the details of the trade which list the prime broker and the dealer as parties of the transaction and allocation details are sent to the dealer, customer and prime broker(s), as applicable. Step 2028.

If the second prime broker has rejected its participation in the trade, and the third prime broker has reviewed the details of the trade, the third prime broker can either approve or reject the trade based on its relationship with the customer. Step 2030. If for example the third prime broker rejects the trade, the customer and dealer receive notification of the prime broker's rejection. Step 2031 If the third prime broker accepts the trade, a determination is made as to whether the third prime broker is acting in a "give-up" capacity. Step 2032. If the third prime broker is not acting in a give-up capacity, but rather only providing GTS, a message indicating the successful trade and the allocation details is transmitted to the dealer, customer, and prime broker via the respective back-office management components 220, 277, and 268 respectively. Step 2034. If the prime broker is acting in a give-up capacity, once the trade details are approved by the prime broker, the prime broker replaces the executing dealer as the counterparty for the trade with the customer and steps in as the counterparty to the trade with the executing dealer. Step 2036. A message including the details of the trade which list the prime broker and the dealer as parties of the transaction and allocation details are sent to the dealer, customer and prime broker(s), as applicable. Step 2038.

The above process repeats itself for each prime broker identified by the customer. If all of the prime brokers reject the trade, the trade remains between the dealer and the customer and the prime broker is excluded. Alternatively, if the multiple prime brokers are adding in tandem on the customer's behalf, each prime broker can approve or reject their portion of the trade in accordance with the flow discussed above.

Thus, while there have been shown and described fundamental novel features of the invention as applied to the exemplary embodiments thereof, it will be understood that omissions and substitutions and changes in the form and details of the disclosed invention may be made by those skilled in the art without departing from the spirit of the invention. It is the intention, therefore, to be limited only as indicated by the scope of the claims appended hereto.

We claim:

1. A computer implemented method of effecting straight-through-processing of trades executed between one or more customers having one or more customer computer systems and one or more dealers having one or more dealer computer systems utilizing one or more prime brokers having one or more prime broker computer systems, the method comprising:
   generating a trade order;
   receiving an indication from the at least one prime broker computer system that the trade order has been approved;
   executing a block trade based on the trade order wherein the trade order includes a reference to the one or more prime brokers selected by the one or more customers and a pre-allocation of customer accounts;
   storing one or more account information records associated with one or more settlement instruction sets in an account database;
   storing a block trade record including details of the block trade;
   generating an allocated trade record associated with the block trade record for each of the account allocations received from the at least one customer computer system;
   receiving an indication from the at least one dealer computer system that the allocated trade records are confirmed;
   enriching the allocated trade records by incorporating one of the settlement instruction sets into each of the allocated trade records.

2. The method of claim 1 wherein the block trade is executed between the one or more customers and the one or more dealers.

3. The method of claim 1 wherein the block trade is executed between the one or more prime brokers and the one or more dealers.

4. The method of claim 1 further comprising: transmitting each of the enriched allocated trade records to an appropriate clearing institution.

5. The method of claim 1 further comprising: transmitting each of the enriched allocated trade records to the one or more customers, the one or more dealers or the one or more prime brokers.

6. The method of claim 1, wherein the block trade records and allocated trade records are accessible by the one or more customer computers systems, one or more dealer computer systems and one or more prime broker computers such that the one or more customers, one or more dealers and one or more prime brokers can view reports.

7. The method of claim 1, wherein the method is performed in a client-server environment.

8. The method of claim 1 further comprising: generating trade inquiries and transmitting the trade inquiries to the one or more dealers.

9. The method of claim 8 further comprising: generating firm prices in response to the trade inquiries and transmitting firm prices to the one or more customers.

10. A computer implemented method of electronically effecting straight-through-processing of a trade between one or more dealers, one or more customers and one or more prime brokers comprising the steps of:
    receiving a first signal indicative of a trade request from the one or more customers to be executed utilizing the one or more prime brokers;
    receiving a second signal indicative of a trade order corresponding to said trade request;
    receiving a third signal indicative of an acceptance of the trade by the one or more customers;
    notifying the one or more prime brokers of the acceptance, and trade order;
    receiving a fourth signal indicative of an acceptance of the trade by the one or more prime brokers;
    executing a block trade based on the trade order wherein the trade order includes a reference to the one or more prime brokers selected by the one or more customers and a pre-allocation of customer accounts.

11. The method of claim 10 wherein the block trade is executed between the one or more customers and the one or more dealers.

12. The method of claim 10 wherein the block trade is executed between the one or more prime brokers and the one or more dealers.

13. The method of claim 10 further comprising:
    storing one or more account information records associated with one or more settlement instruction sets in an account database;
    storing a block trade record including details of the block trade;
    generating an allocated trade record associated with the block trade record for each of the account allocations;

receiving an indication from the at least one dealer computer system that the allocated trade records are confirmed;

enriching the allocated trade records by incorporating one of the settlement instruction sets into each of the allocated trade records.

14. The method of claim 13, further comprising: generating an electronic trade confirmation for each of the allocated trade records that includes at least trade details associated with the allocated trade record and a settlement instruction set.

15. The method of claim 10, wherein the first signal is an indication of a click of a graphical button at the one or more customer's computer and the third signal is an indication of a click of a graphical button at the one or more prime broker's computer.

16. A system for effecting straight-through-processing of a trade between one or more dealers having one or more dealer computer systems, one or more customers having one or more customer computer systems and one or more prime brokers having one or more prime broker computer systems, the system comprising:

a trade execution system;

wherein the one or more customer computer systems, one or more dealer computer systems and one or more prime broker computer systems each have software thereon for permitting communication of trading data through the trade execution system the trade execution system operative programming to:

receive an inquiry for a trade from at least one of the customers directed to the one or more dealer computer systems;

transmit said trade inquiry to said dealer computer systems and receive a trade price for the trade from at least one of said dealer computer systems;

transmit said trade price to said at least one customer computer system;

receive from said customer computer system an indication that said trade price is accepted and that the one or more prime brokers is to be a part of the trade;

transmit said trade price to said one or more prime broker systems;

receive from said prime broker system an indication that said trade price is accepted;

executing a block trade based on the accepted trade price.

17. The system of claim 16 wherein the block trade is between the one or more customers and the one or more dealers.

18. The system of claim 16 wherein the block trade is between the one or more dealers and the one or more prime brokers.

19. The system of claim 16 further comprising a trade history database wherein details related to the trade are stored wherein the trade history database is accessible by the one or more customer computers systems, one or more dealer computer systems and the prime broker computer systems.

* * * * *